United States Patent
Seshia et al.

(10) Patent No.: US 6,250,156 B1
(45) Date of Patent: Jun. 26, 2001

(54) DUAL-MASS MICROMACHINED VIBRATORY RATE GYROSCOPE

(75) Inventors: Ashwin A. Seshia, Berkeley; Roger T. Howe, Martinez, both of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/298,631

(22) Filed: Apr. 23, 1999

Related U.S. Application Data

(63) Continuation-in-part of application No. 08/865,726, filed on May 30, 1997, now Pat. No. 6,067,858, which is a continuation-in-part of application No. 08/658,924, filed on May 19, 1996, now Pat. No. 5,992,233.

(51) Int. Cl.$^7$ .................................................. G01C 19/00
(52) U.S. Cl. ........................................................ 73/504.12
(58) Field of Search .......................... 73/504.12, 504.14, 73/504.02

(56) References Cited

U.S. PATENT DOCUMENTS

| | | | |
|---|---|---|---|
| 5,025,346 | 6/1991 | Tang et al. | 361/283 |
| 5,203,208 | 4/1993 | Berstein | 73/505 |
| 5,241,861 * | 9/1993 | Hulsing, II | 73/505 |
| 5,329,815 | 7/1994 | Dunn et al. | 73/505 |
| 5,349,855 | 9/1994 | Bernstein et al. | 73/514 |
| 5,359,893 | 11/1994 | Dunn et al. | 73/505 |
| 5,377,544 | 1/1995 | Dunn et al. | 73/505 |
| 5,392,650 | 2/1995 | O'Brien et al. | 73/517 |
| 5,408,877 | 4/1995 | Grieff et al. | 73/505 |
| 5,447,068 | 9/1995 | Tang | 73/514 |
| 5,465,604 | 11/1995 | Sherman | 73/10 |
| 5,491,604 | 2/1996 | Nguyen et al. | 361/278 |
| 5,495,761 | 3/1996 | Diem et al. | 73/514 |

(List continued on next page.)

OTHER PUBLICATIONS

Y. Gianchandami et al., "Micron–sized, High Aspect Ratio Bulk Silicon Micromechanical Devices", Micro Electrical Systems, pp. 208–212, Travemunde, Germany, Feb. 4–7, 1992.

W. Tang et al., "Electrostatic Comb Drive Levitation and Control Mehod", Journal of Electromechanical Systems, vol. 1, No. 4 pp. 170–176, Dec. 1992.

J. Bernstein et al., "A Micromachined Comb–Drive Tuning Fork Rate Gyroscope", Digest IEEE/ASME Micro Electromechanical System, (MEMS) Workshop, p. 143–148, Ft. Lauderdale, FL. Feb. 1993.

(List continued on next page.)

*Primary Examiner*—Richard A. Moller
(74) *Attorney, Agent, or Firm*—Fish & Richardson, P.C.

(57) ABSTRACT

A microfabricated gyroscopic sensor for measuring rotation about a Z-axis. The sensor includes a substrate, a first mass, a second mass, a coupling system connecting the first mass and the second mass, and a suspension system connecting the first mass and the second mass to the substrate. The sensor further includes a drive system to cause the first mass and the second mass to vibrate in an antiphase mode along a drive axis, and a position sensor to measure a displacement of the first mass and the second mass along a sense axis perpendicular to the drive axis and generally parallel to the surface of the substrate, wherein rotation of the first mass and the second mass about the Z-axis perpendicular to the surface of the substrate and vibration of the first mass and the second mass along the drive axis generates a Coriolis force to vibrate the first mass and the second mass along the sense axis in antiphase to each other.

23 Claims, 14 Drawing Sheets

U.S. PATENT DOCUMENTS

| | | | |
|---|---|---|---|
| 5,505,084 | 4/1996 | Greiff et al. | 73/504.14 |
| 5,511,420 | 4/1996 | Zhao et al. | 73/514 |
| 5,535,902 | 7/1996 | Greiff | 216/2 |
| 5,563,343 | 10/1996 | Shaw et al. | 73/514 |
| 5,565,625 | 10/1996 | Howe et al. | 73/514 |
| 5,583,290 | 12/1996 | Lewis | 73/514 |
| 5,600,064 | 2/1997 | Ward | 73/504 |
| 5,600,065 | 2/1997 | Kar et al. | 73/504 |
| 5,610,334 | 3/1997 | Fima et al. | 73/504 |
| 5,627,317 | 5/1997 | Offenberg et al. | 73/514 |
| 5,627,318 | 5/1997 | Fuji et al. | 73/514 |
| 5,650,568 | 7/1997 | Greiff et al. | 73/504 |
| 5,992,233 * | 11/1999 | Clark | 73/514.35 |

OTHER PUBLICATIONS

J. Soderkvist, "Micromachined Gyrpscopes", Sensors and Actuators A. vol. 43, pp. 65–71, 1994.

Putty, "A Micromachined Vibrating Ring Gyroscope", Solid–State Sensor and Actuator Workshop, pp. 213–220, Hilton Head, Fl. Jun. 1994.

Johnson, "Vibrating Rotation Sensors", International Congress and Exposition, SAE SP–1066, pp. 41–47, 1995.

K. Tanaka et al., "Vibrating Silicon Microgyroscope", Technical Digest of the 13th Sensor Symposium, pp. 185–188, Japan, 1995.

J. Choi et al., "Silicon Resonant Angular Rate Sensor by Reactive Ion Etching", Technical digest of the $13^{th}$ Sensor Symposium, pp. 177–180, Japan, 1995.

P. Ljung et al., "Micromacined Two Input Axis Angular rate Sensor", ASME dynamic systems and Control Division pp. 957–962, SF CA, Nov. 1995.

* cited by examiner

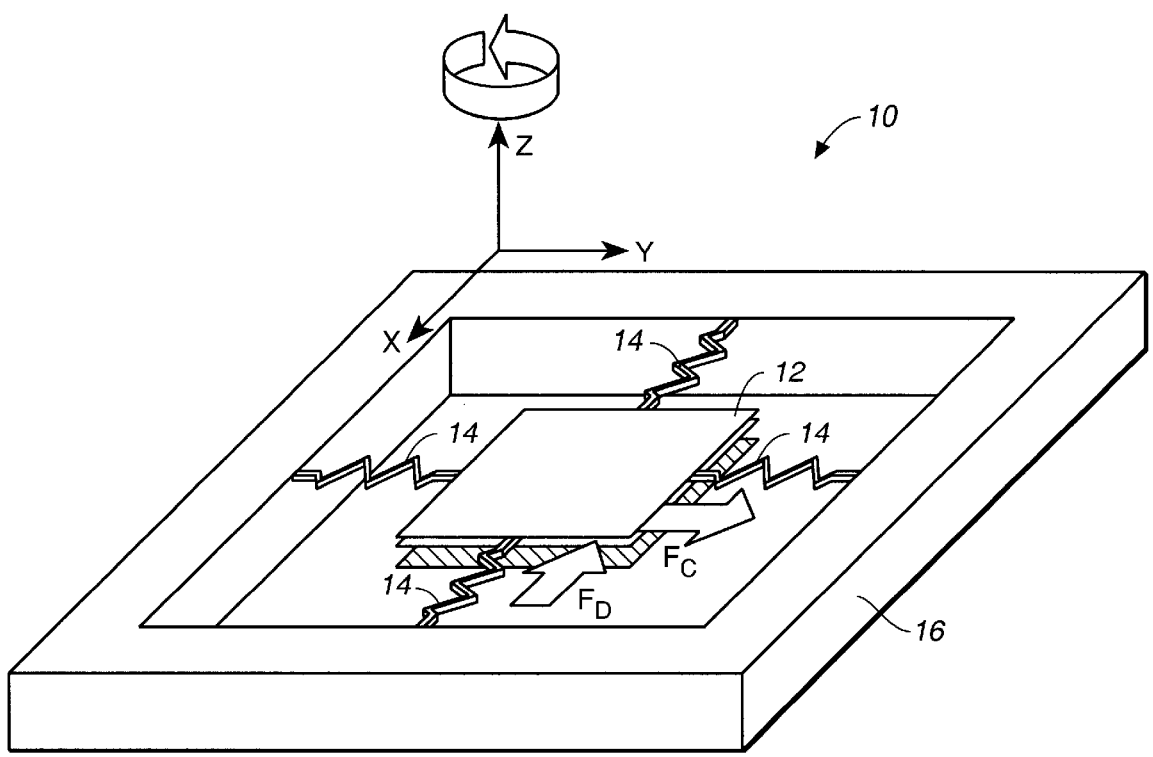
FIG._1

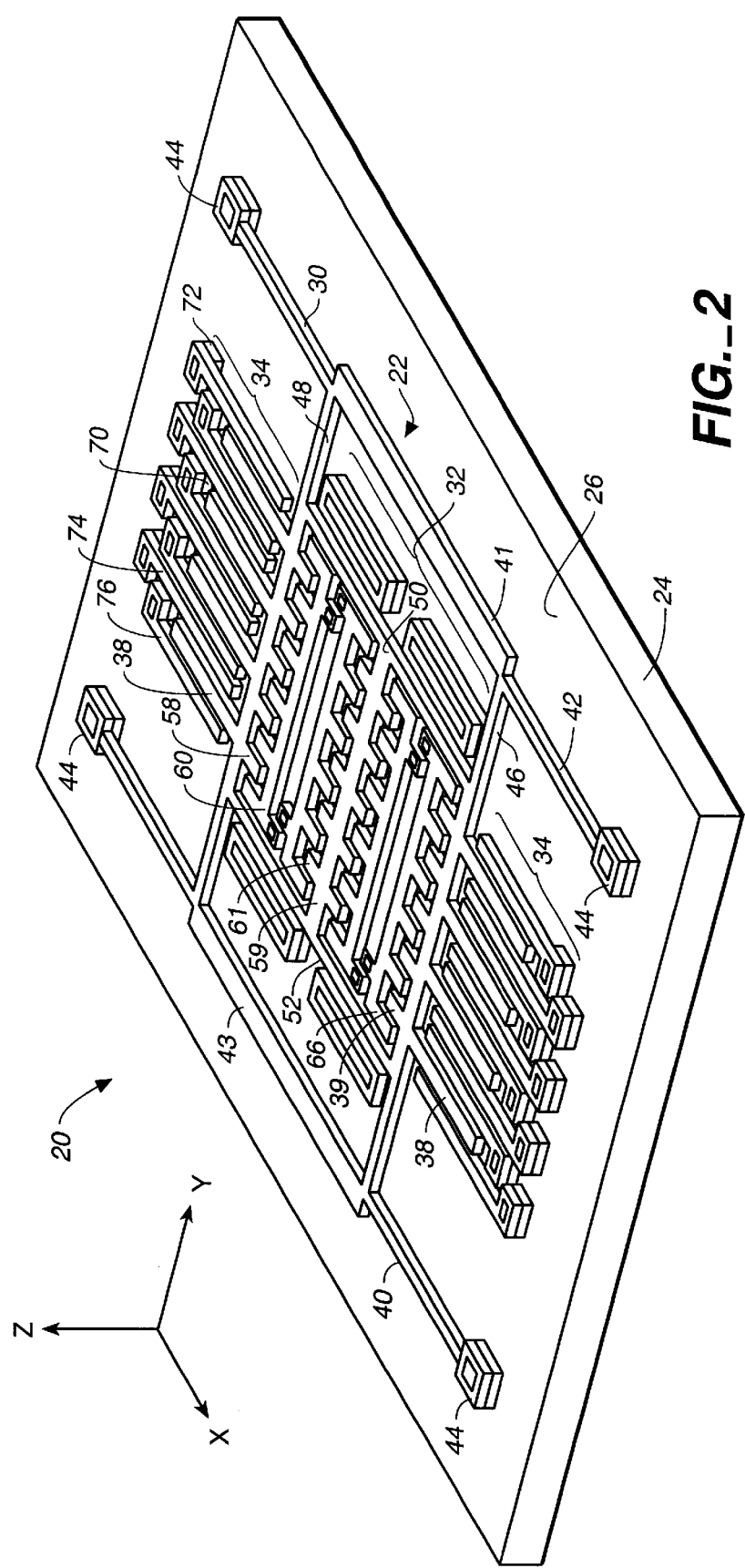
FIG._2

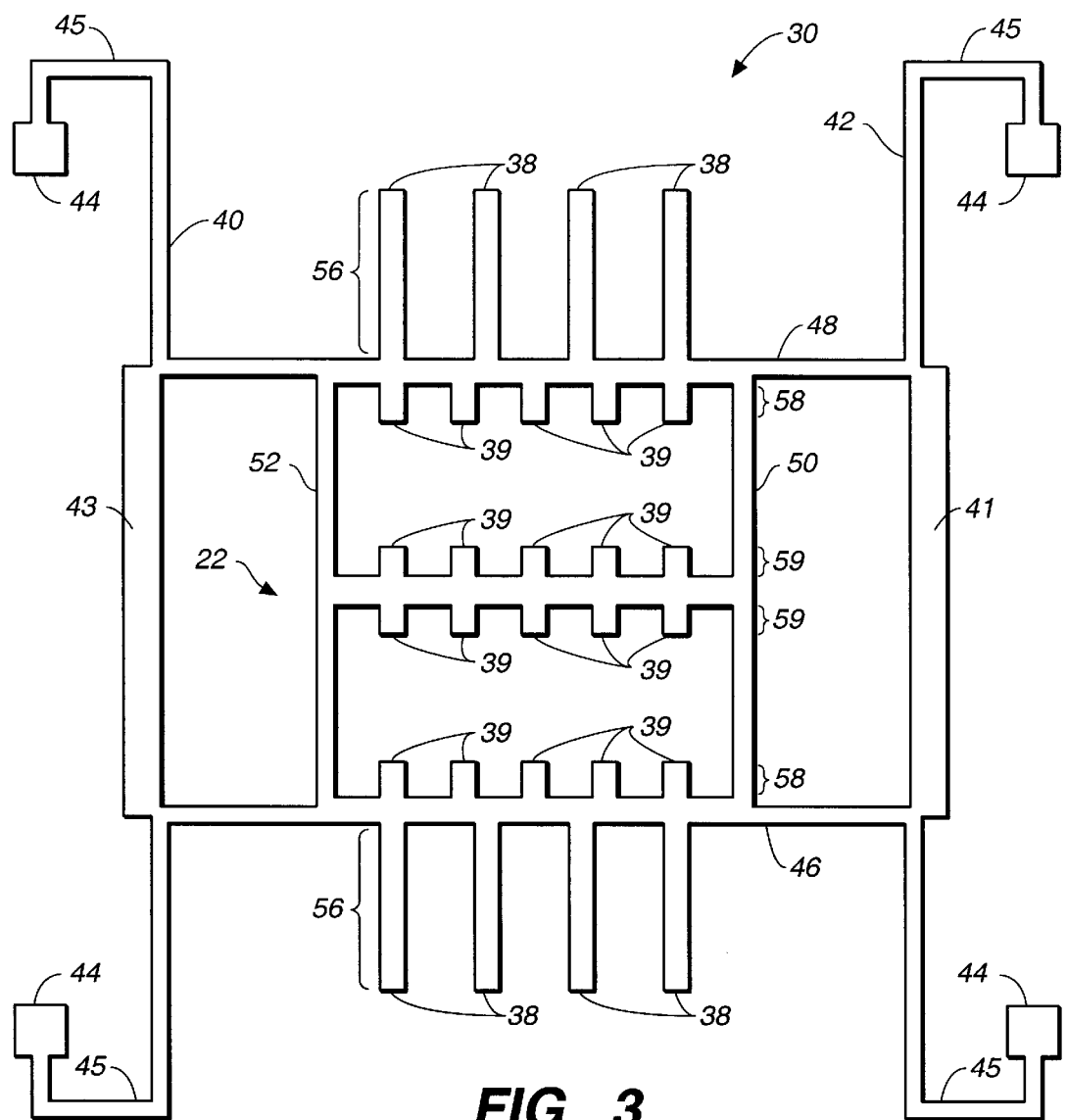
FIG._3

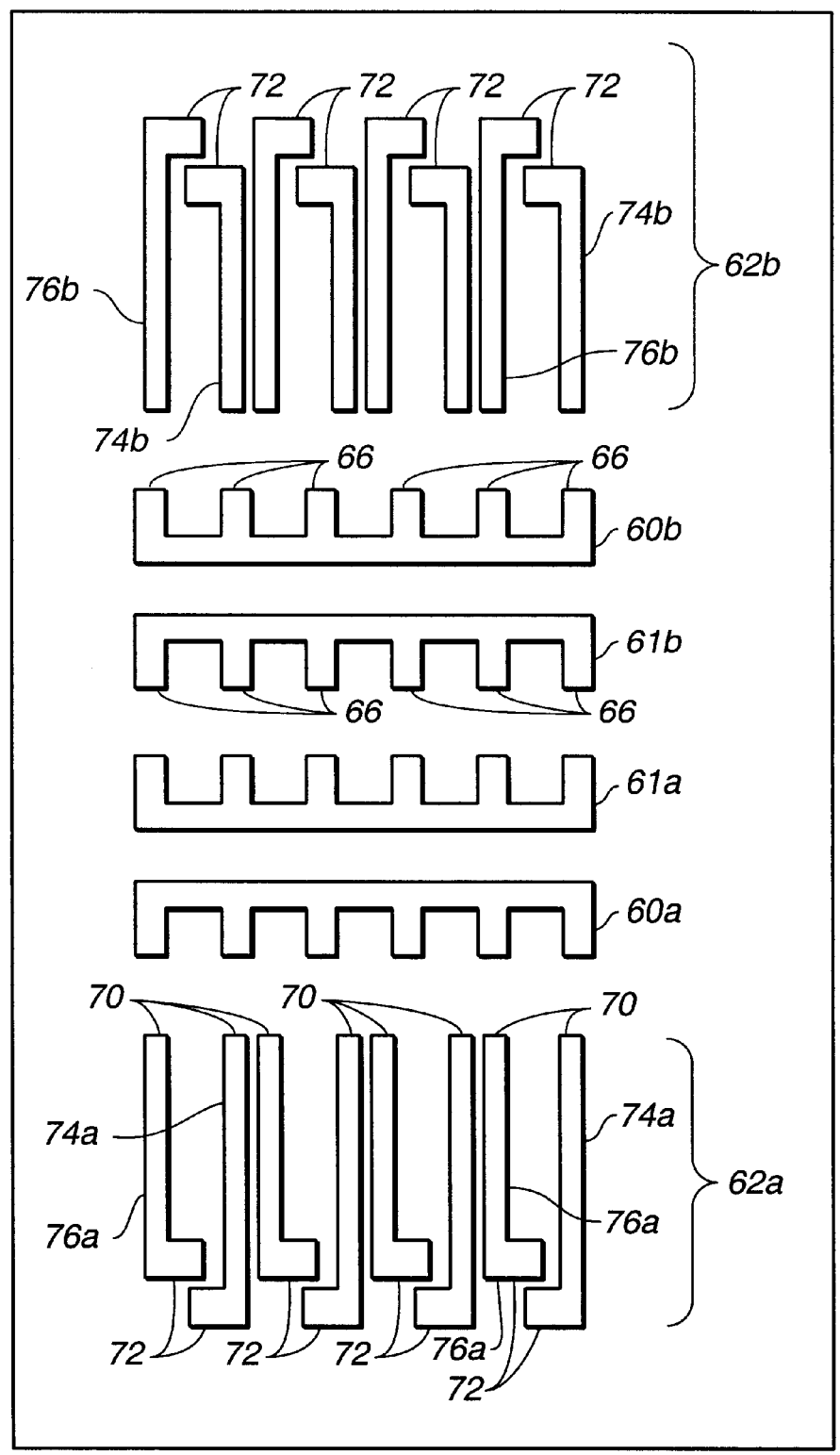
FIG._4

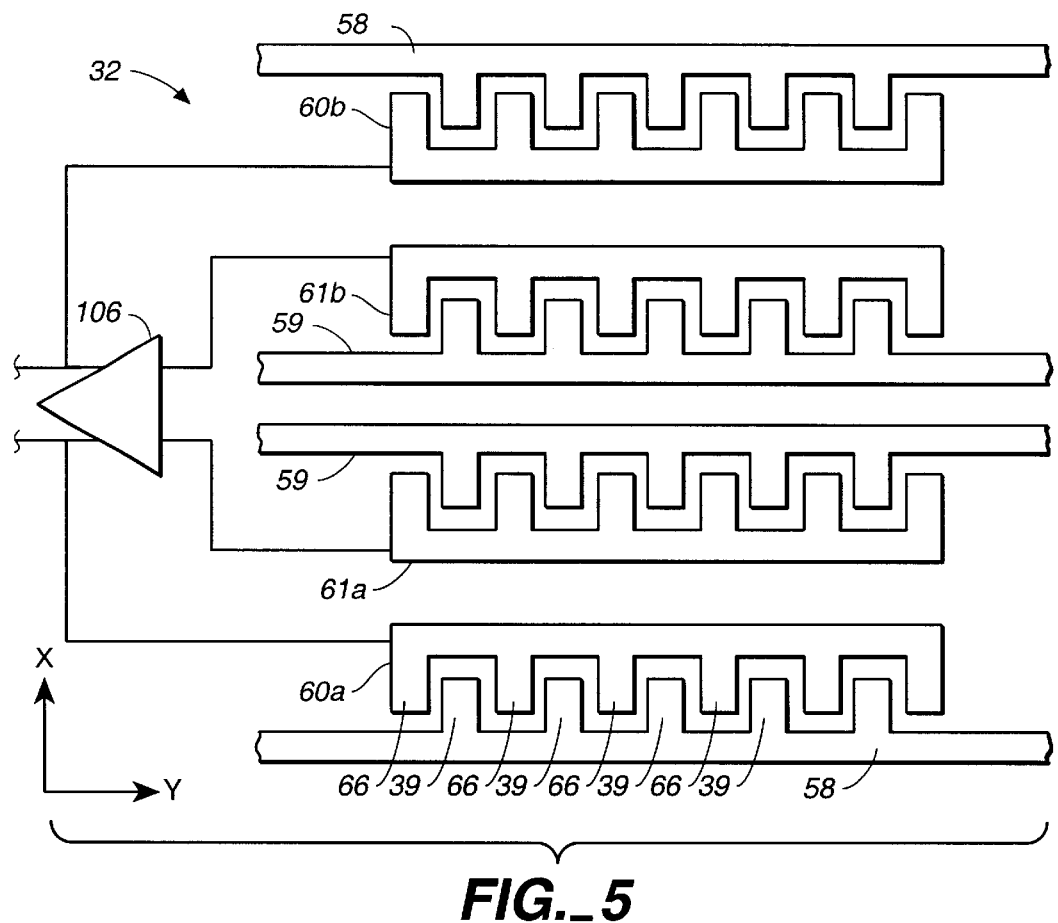
FIG._5
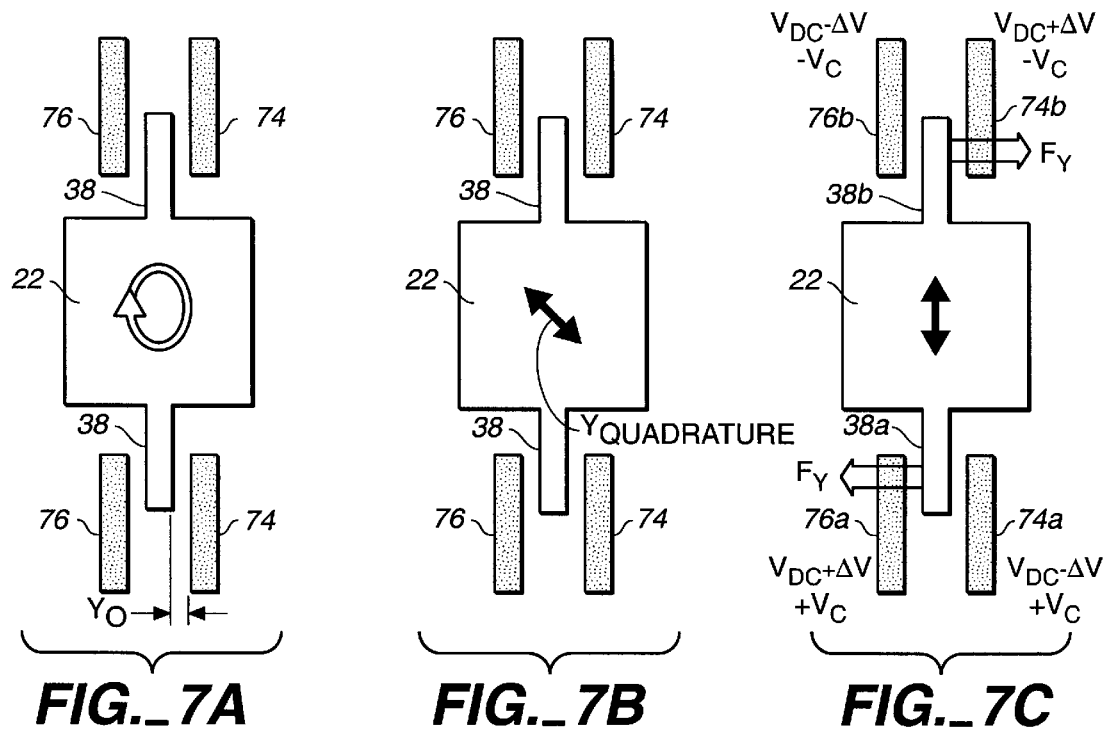
FIG._7A  FIG._7B  FIG._7C

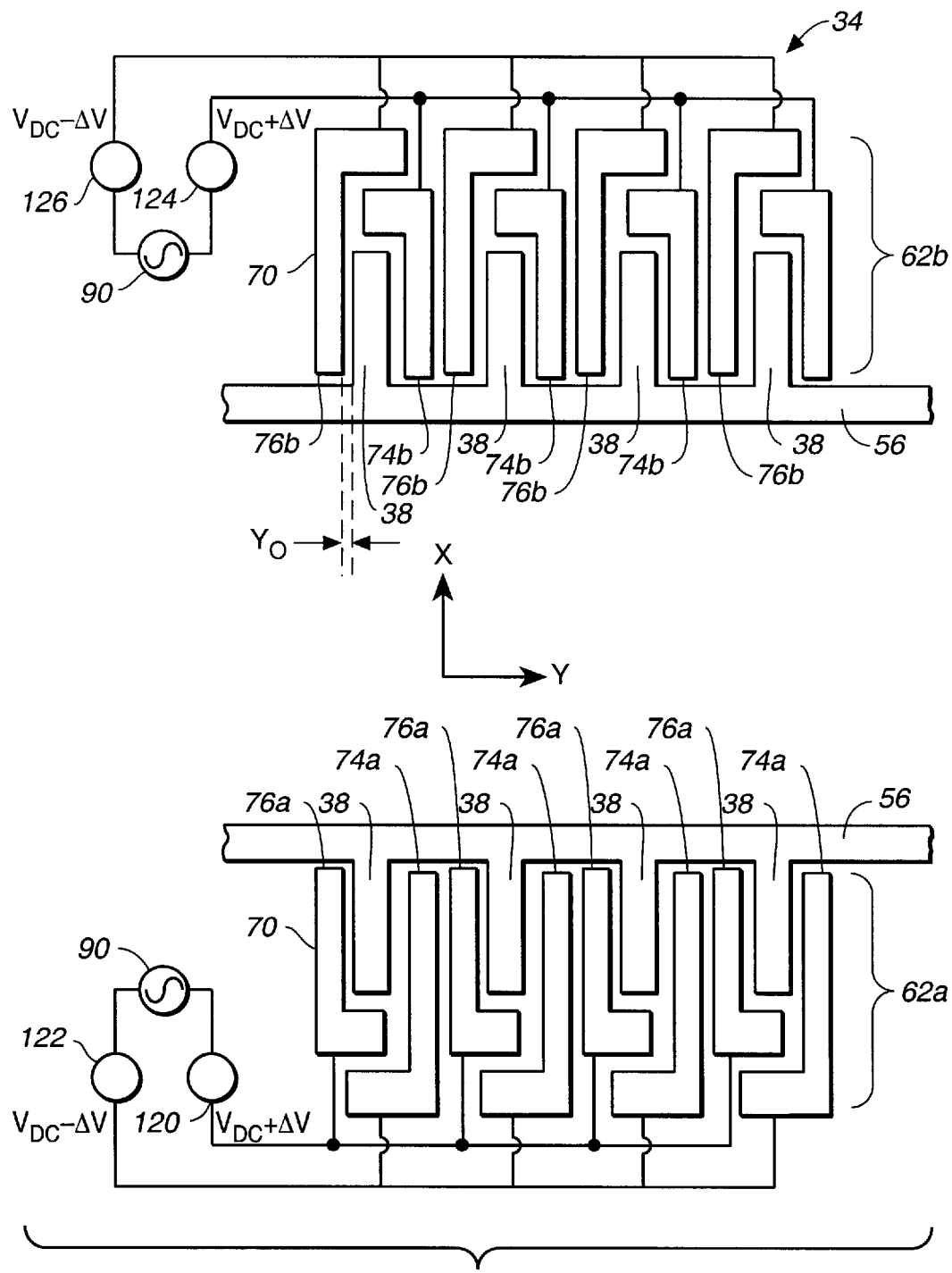
FIG._6

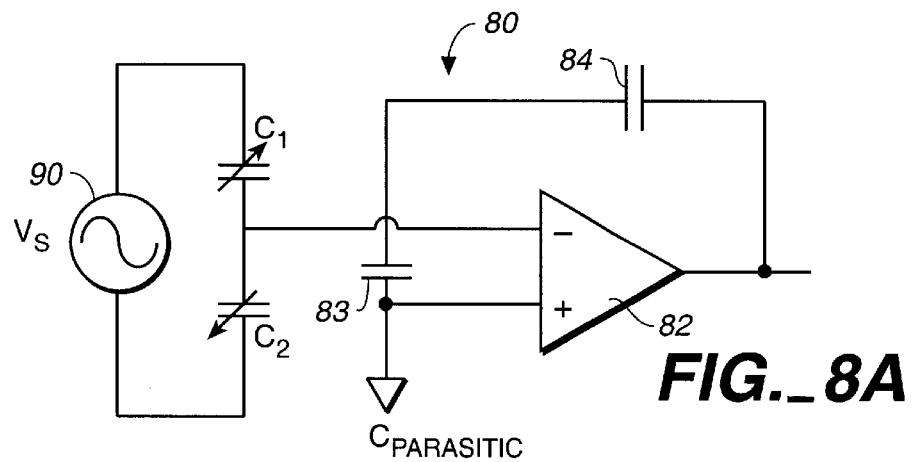
FIG._8A
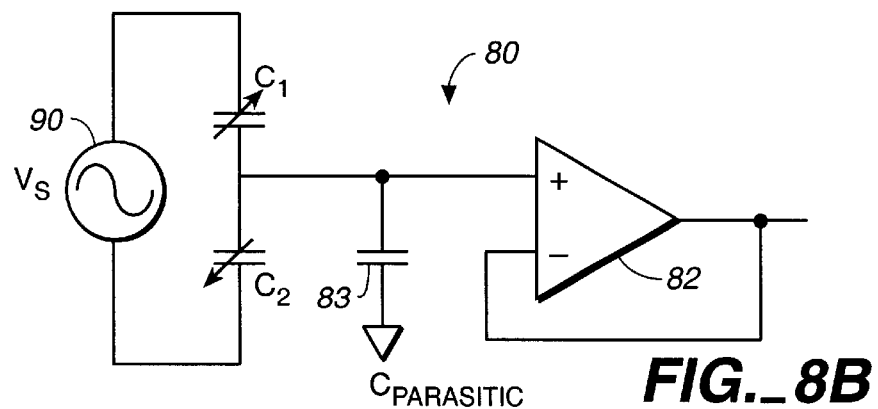
FIG._8B
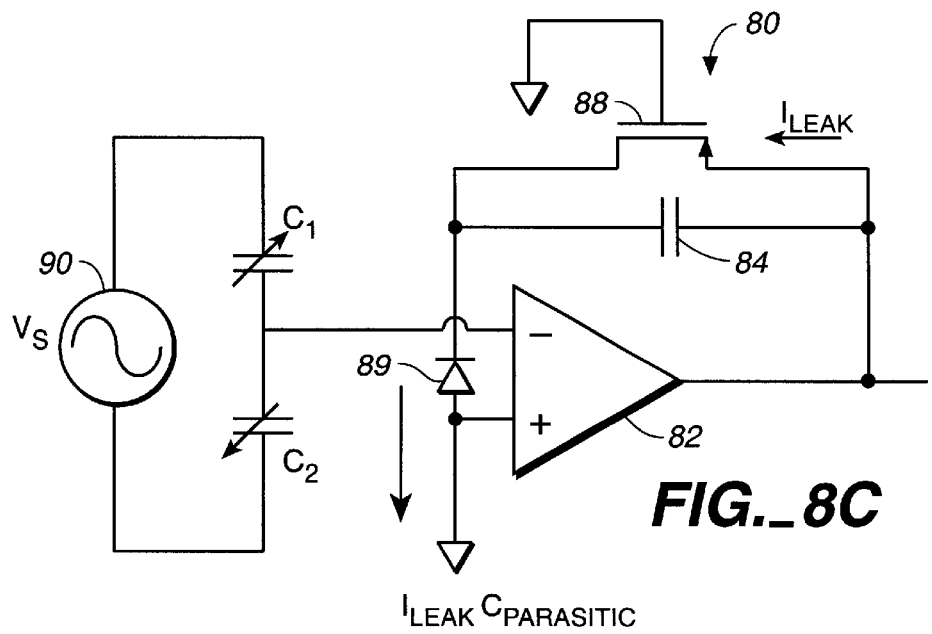
FIG._8C

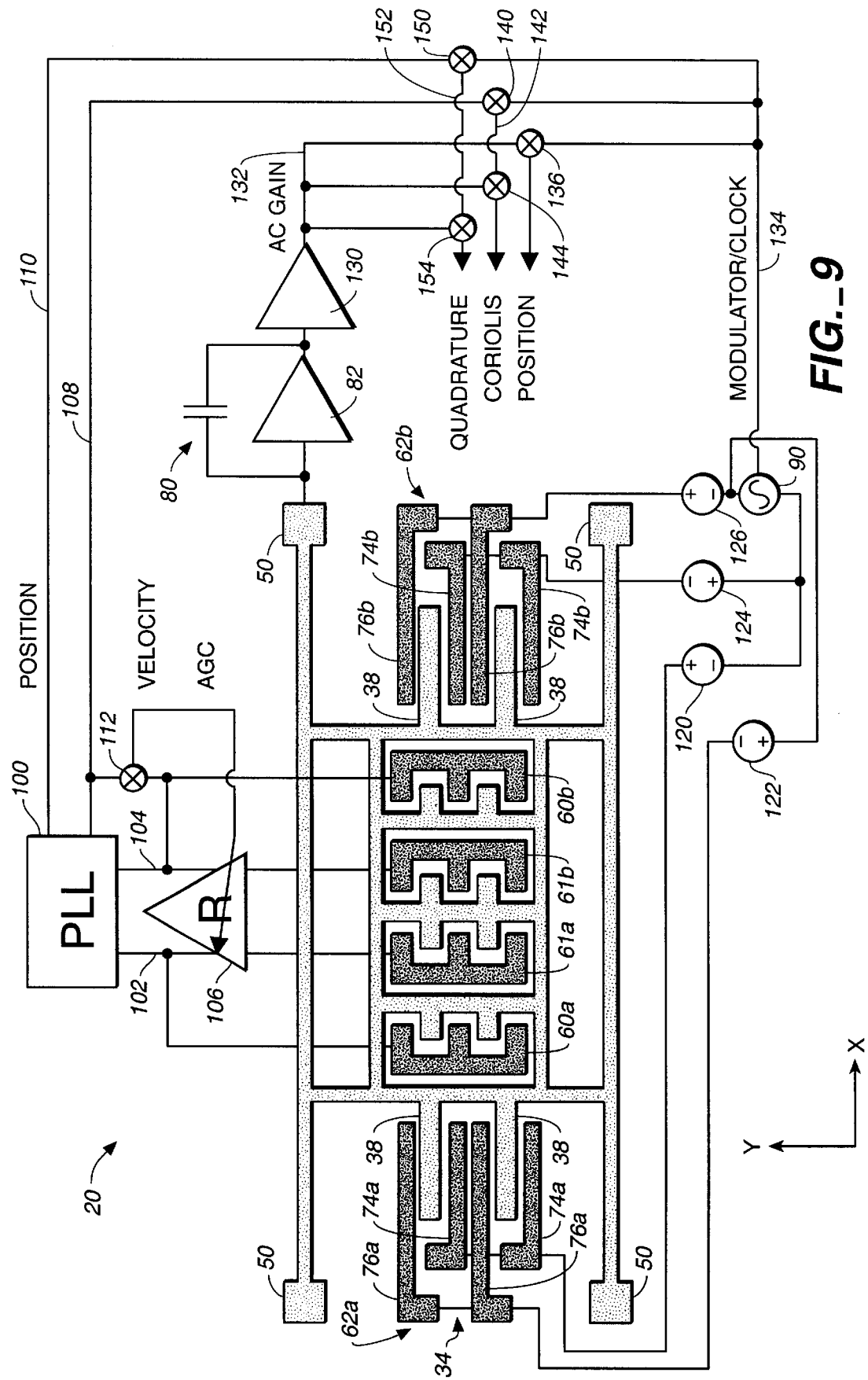
FIG._9

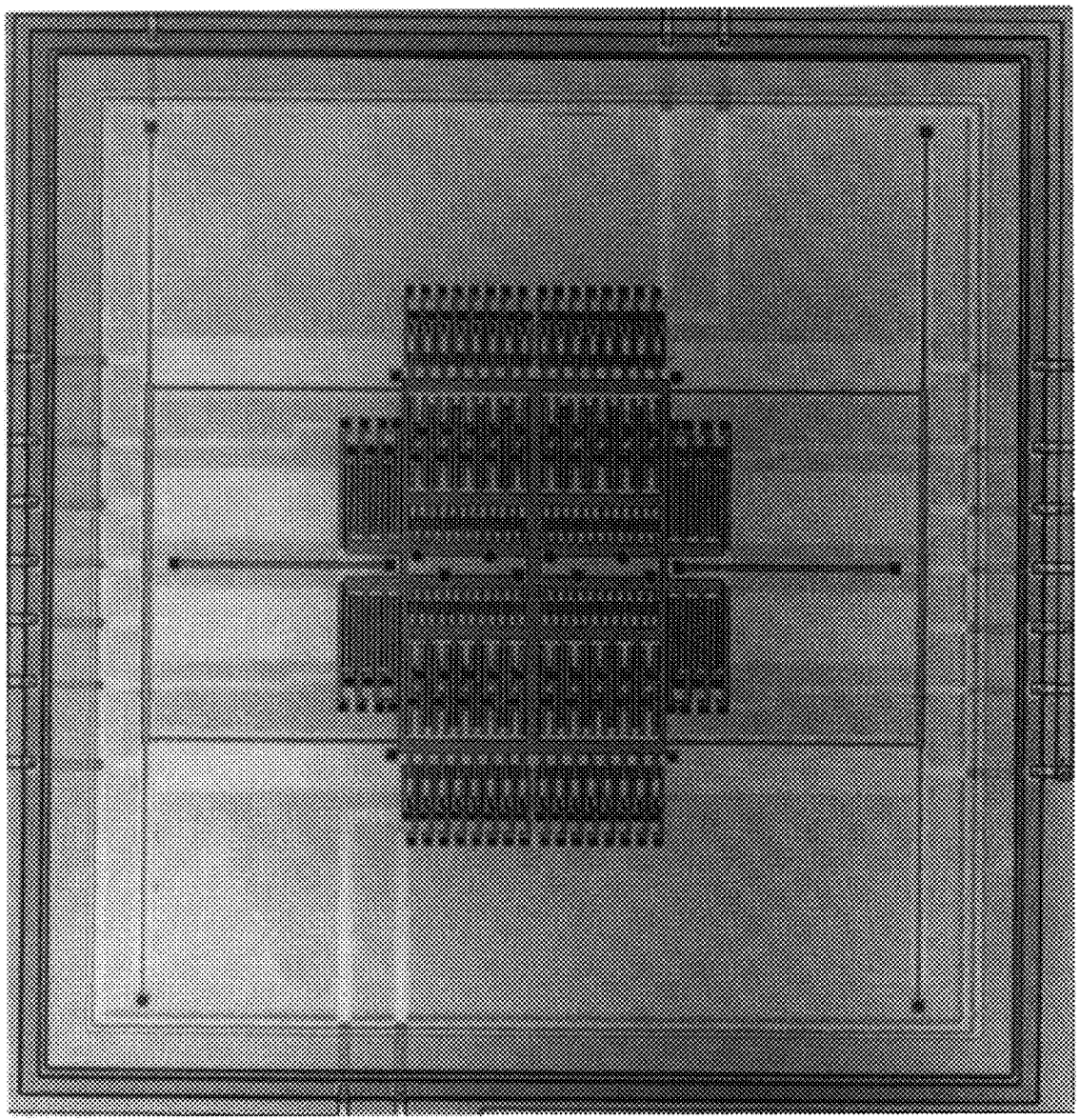
FIG._10

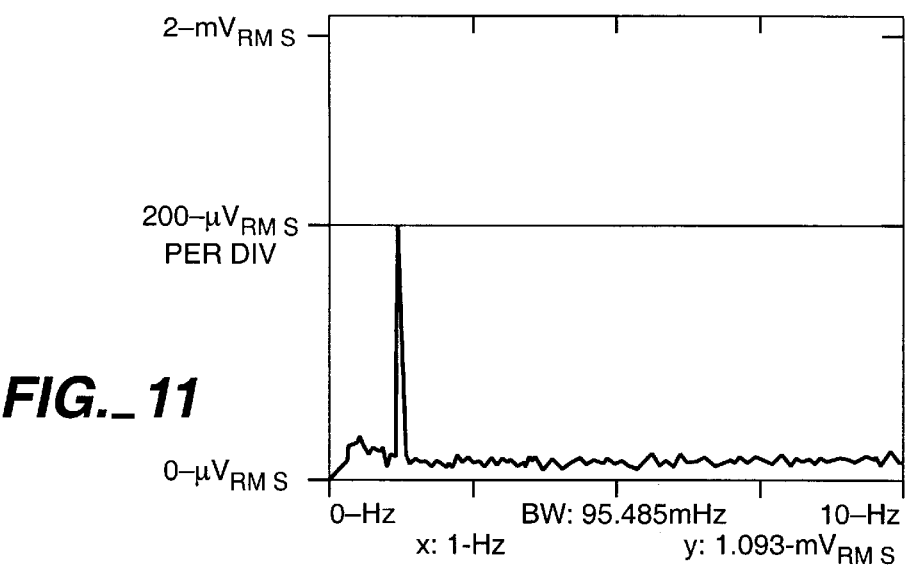
FIG._11
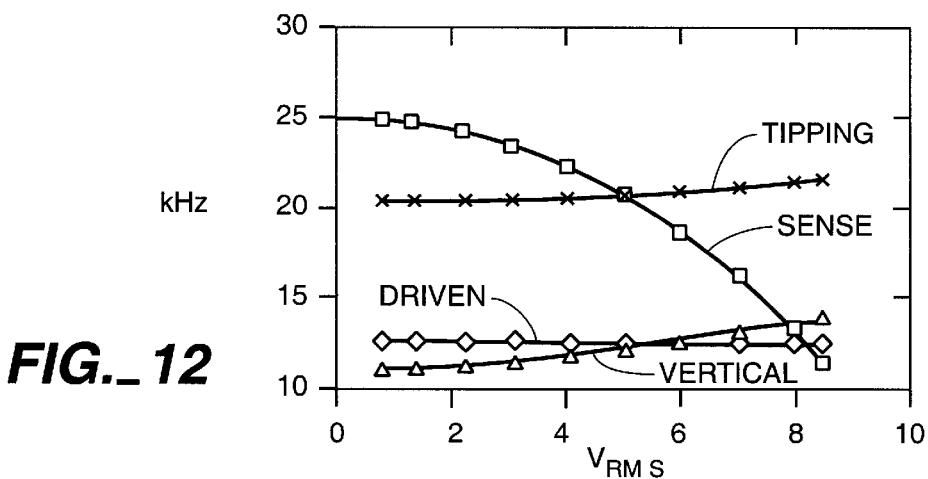
FIG._12
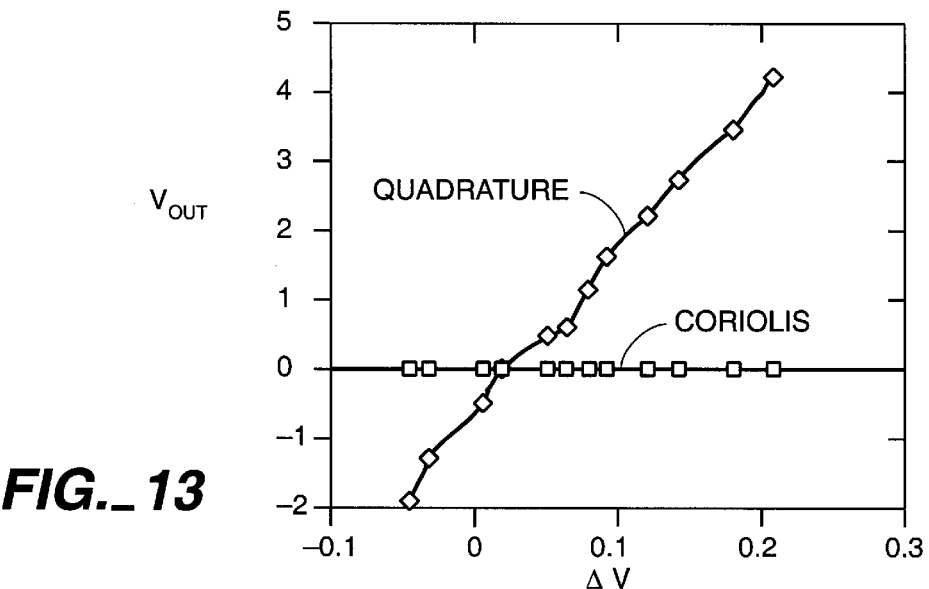
FIG._13

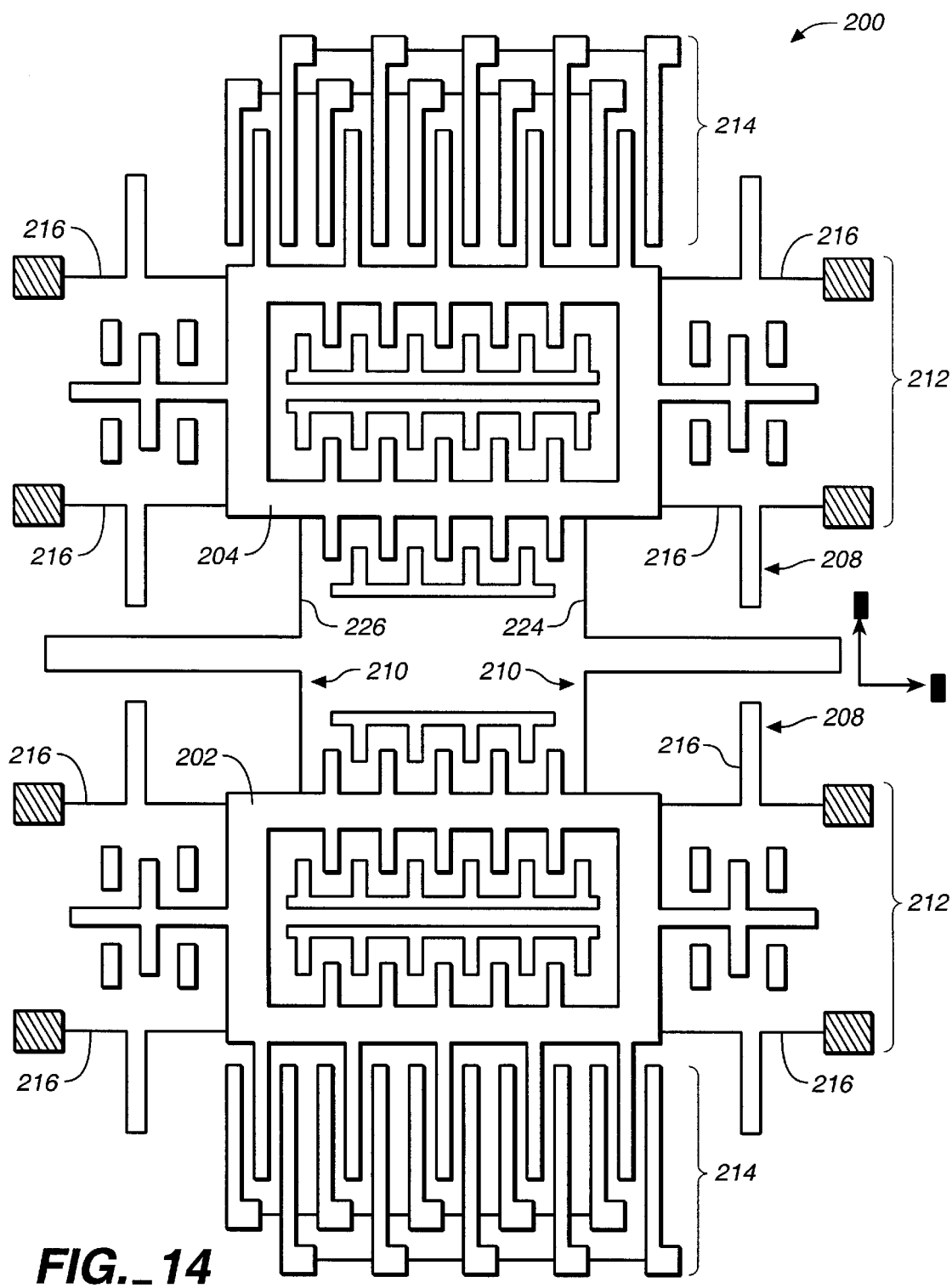
FIG._14

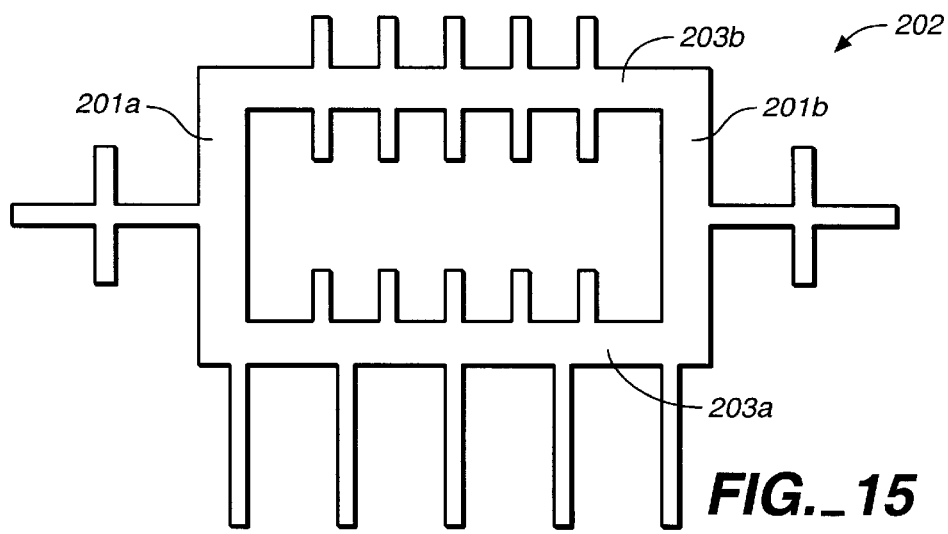
FIG._15
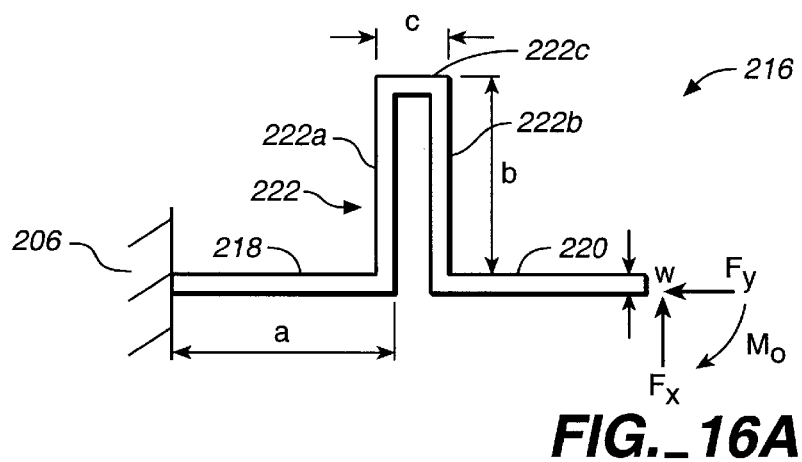
FIG._16A
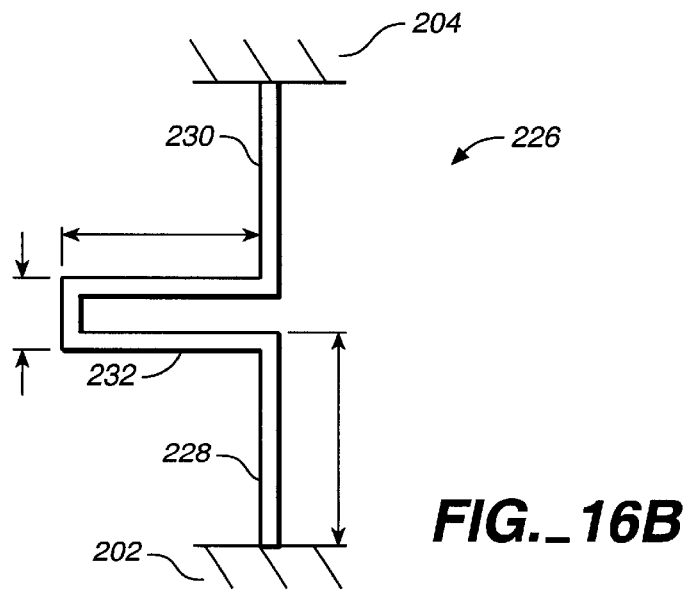
FIG._16B

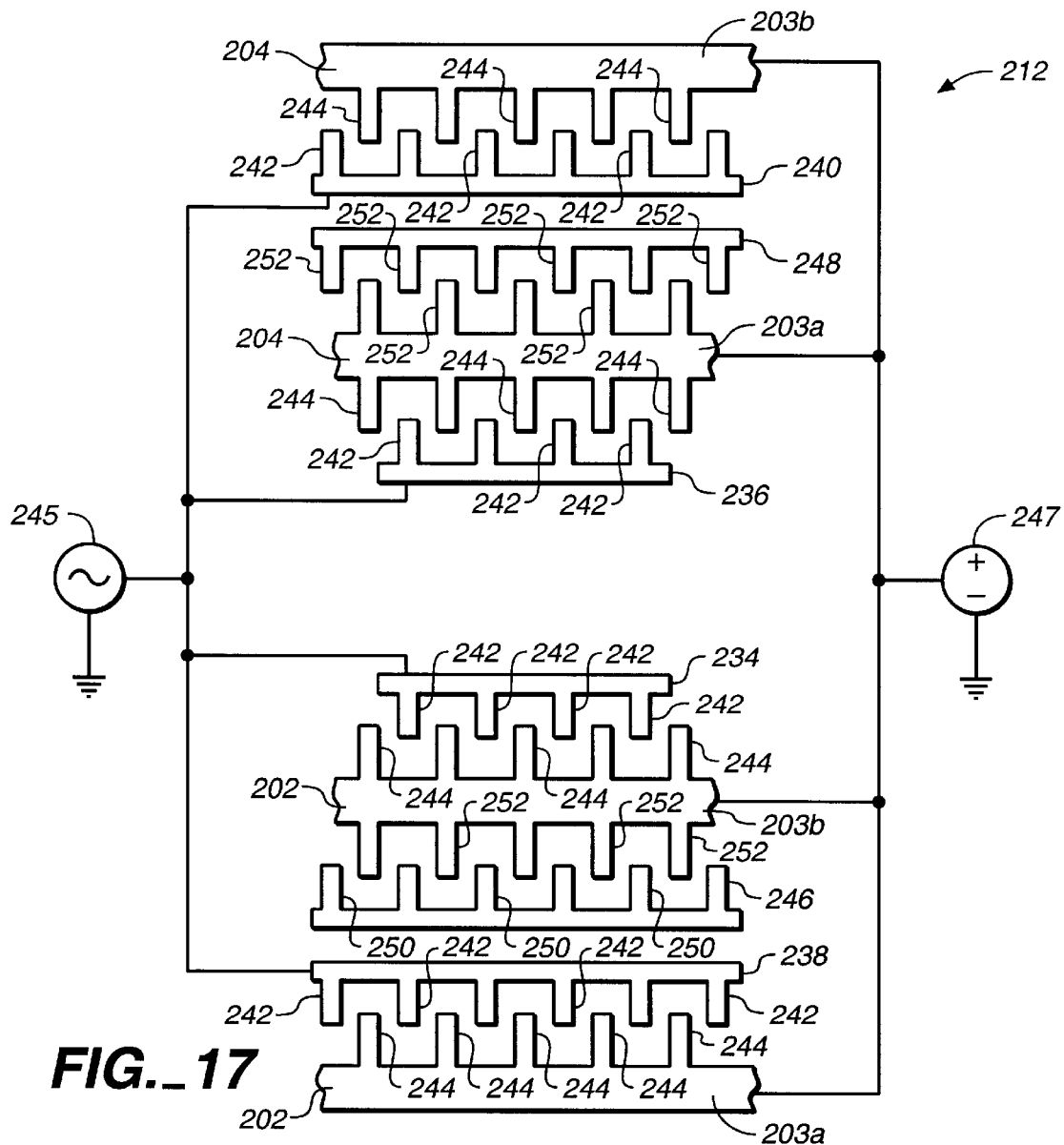
FIG._17
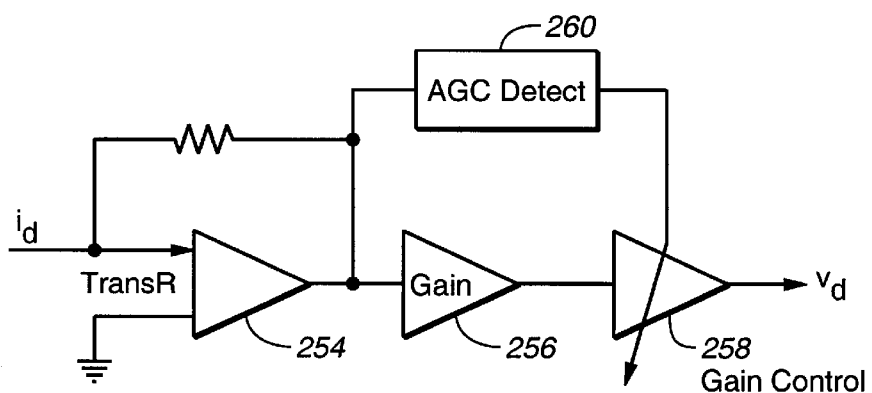
FIG._18

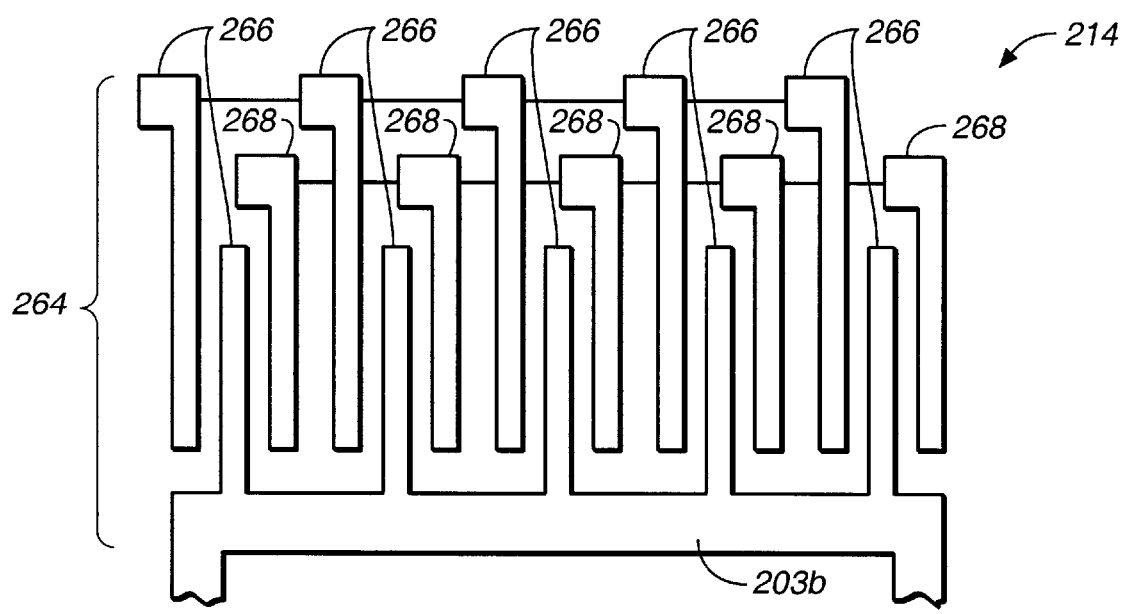
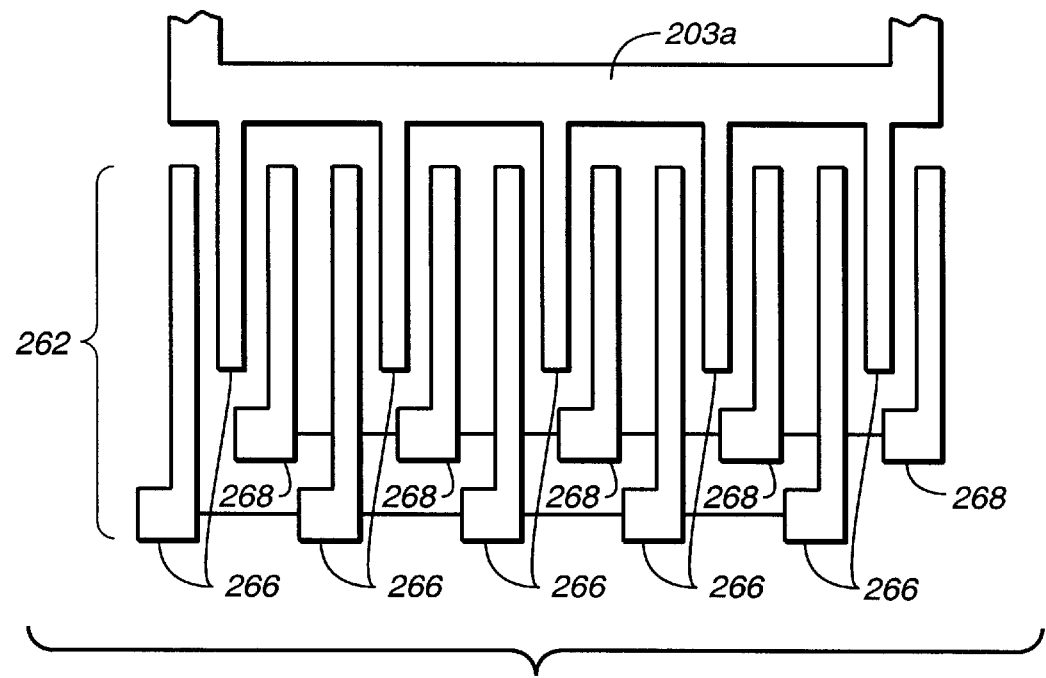
FIG._19

DUAL-MASS MICROMACHINED VIBRATORY RATE GYROSCOPE

CROSS-REFERENCE TO RELATED APPLICATION

This application is a continuation-in-part of U.S. application Ser. No. 08/865,726, filed May 30, 1997 (U.S. Pat. No. 6,067,858) which is a continuation-in-part of U.S. Ser. No. 08/658,924, filed May 31, 1996, (U.S. Pat. No. 5,992, 233) the entire disclosures of which are incorporated herein by reference.

STATEMENT OF RIGHTS

This invention was made with United States government support under Grant (contract) Number N66001-97-C-8643 awarded by DARPA/Honeywell ("federal flow-through"). The government has certain rights to this invention.

BACKGROUND

The present invention relates generally to microfabricated sensors, and more particularly to microfabricated gyroscopic sensors.

Multi-axis sensors are highly desirable for inertial sensing of motion in three dimensions. Previously, such sensors were constructed of relatively large and expensive electromagnetic devices. More recently, micromechanical sensors have been fabricated using semiconductor processing techniques. Specifically, micromechanical accelerometers and gyroscopes have been formed from silicon wafers by using photolithographic techniques. Such microfabricated sensors hold the promise of large scale production and therefore low cost.

One objective in the construction of microfabricated sensors is to increase the sensitivity and improve the signal to noise ratio of the device. Another objective is to simplify the fabrication steps so as to reduce the cost and complexity and to increase the yield in the manufacturing process.

The integration of three gyroscopic sensors to measure the rotation rates about the three separate axes coupled with three accelerometric sensors to measure the acceleration along the three axes on a single chip would provide a monolithic, six degree-of-freedom inertial measurement system capable of measuring all possible translations and orientations of the chip. There has been some difficulty in constructing a vibratory rate gyroscope to measure the rotation about the axis normal to the plane of the silicon chip, i.e., the Z-axis.

SUMMARY

In one aspect, the invention is directed to a microfabricated gyroscopic sensor to measure rotation about an input axis. The sensor includes a substrate, a first mass, a second mass, a coupling system connecting the first mass and the second mass, a suspension system connecting the first mass and the second mass to the substrate, a drive system to cause the first mass and the second mass to vibrate in an antiphase mode along a drive axis, and a position sensor to measure a displacement of the first mass and the second mass along a sense axis perpendicular to the drive axis and generally parallel to the surface of the substrate. Rotation of the first mass and the second mass about the input perpendicular to the surface of the substrate and vibration of the first mass and the second mass along the drive axis generates a Coriolis force to vibrate the first mass and the second mass along the sense axis in antiphase to each other.

Implementations of the invention may include the following features. The position sensor may uses a difference in deflection of the first mass and the second mass along the sense axis to measure the Coriolis force. A signal processor may be coupled to an output of the position sensor to generate a signal varying with the rate of rotation of the first mass and the second mass about the input axis. The first mass and the second mass may have substantially the same mass. The coupling system may include a first coupling spring and a second coupling spring. Each coupling spring may have a first linear portion coupled to the first mass, a second linear portion coupled to the second mass, and a coupling beam extending outward perpendicularly from the first and second linear portions. The first and second linear portions may be substantially linearly aligned and parallel to the drive axis and may have substantially the same length. The suspension system may include a plurality of hairpin suspension elements. Each hairpin suspension element may have a first connecting portion joined to the substrate, a second connecting portion joined to the first mass or the second mass, and a suspension beam which extends outward perpendicularly from the first connecting portion and the second connecting portion. The first and second connecting portions may be linearly aligned and may have substantially the same length.

The drive system may includes a first drive electrode connected to the substrate, a second drive electrode connected to the substrate and positioned substantially in parallel to the first drive electrode, a first voltage source coupled to the first drive electrode and the second drive electrode to apply an alternating voltage to the first drive electrode and the second drive electrode, and a second voltage source coupled to the first mass and the second mass to apply a DC voltage to the first mass and the second mass. The first and second masses may vibrate in opposing directions in response to alternating voltages being applied to the first and second drive electrode. A first plurality of drive fingers may project along the drive axis from the first drive electrode, and a second plurality of drive fingers may project along the drive axis toward the first drive electrode from the first mass. The second plurality of drive fingers may be interdigitated with the first plurality of drive fingers. A third plurality of drive fingers may project along the drive axis from the second drive electrode, and a fourth plurality of drive fingers may project along the drive axis toward the second drive electrode from the second mass. The fourth plurality of drive fingers may be interdigitated with the third plurality of drive fingers. A first feedback electrode may connected to the substrate and having a first plurality of feedback fingers projecting along the drive axis toward the first mass, and a second plurality of feedback fingers may project along the drive axis toward the first feedback electrode from the first mass, the second plurality of feedback fingers being interdigitated with the first plurality of feedback fingers. A second feedback electrode may be connected to the substrate and have a third plurality of feedback fingers projecting along the drive axis toward the second mass, and a fourth plurality of feedback fingers may project along the drive axis toward the second feedback electrode from the second mass, the fourth plurality of feedback fingers being interdigitated with the third plurality of feedback fingers.

In another aspect, the invention is directed to a microfabricated gyroscopic sensor to measure rotation about an input axis. The sensor has a substrate, a first mass connected to the substrate by a suspension system, a second mass connected to the substrate by the suspension system, a drive system to apply an oscillatory force to the first mass and the second mass along a drive axis to cause the first mass and the second mass to vibrate in an antiparallel mode, and a position sensor to measure a deflection of the first mass and the second mass along a sense axis perpendicular to the drive axis and generally parallel to the surface of the substrate. Rotation of the first mass and the second mass about the input axis perpendicular to the surface of the substrate and vibration of the first mass and the second mass along the drive axis generates a Coriolis force to vibrate the first mass and the second mass along the sense axis in antiphase to each other.

Implementations of the invention may include the following. A coupling system may connect the first mass and the second mass.

In another aspect, the invention is directed to a method of sensing rotation with a microfabricated gyroscopic sensor. In the method, a microfabricated first mass connected to a substrate vibrates along a drive axis, a microfabricated second mass connected to the substrate and to the first mass vibrates along the drive axis, and a first mass and the second mass are rotated about an input axis. Rotation of the first mass and the second mass about the input axis and vibration of the first mass and the second mass along the drive axis generates a Coriolis force to vibrate the first mass and the second mass along a sense axis perpendicular to the drive axis. A displacement of the first mass and the second mass along the sense axis is measured.

Implementations of the invention may include the following. The first mass and the second mass may vibrate in antiphase along the drive axis. The input axis may be perpendicular to the drive axis and the sense axis. A difference in displacements of the first and second masses along the sense axis may be measured.

Advantages of the invention include the following. The gyroscopic sensor measures rotation about an axis perpendicular to the surface of the substrate. The invention allows use of the difference deflection mode to measure the Coriolis force. The invention allows cancellation of the common mode thermal drifts and common mode acceleration. The invention allows for greater amplitude of proof mass motion. The invention allows for more precise mode tuning of the drive mode and the sense mode.

Other advantages and features of the invention will be apparent from the description which follows, including the drawings and claims.

BRIEF DESCRIPTION OF THE DRAWINGS

FIG. 1 is an schematic illustration of a spring-mass system which is equivalent to an electrostatic gyroscope.

FIG. 2 is a schematic perspective view of a microfabricated gyroscopic sensor according to the present invention.

FIG. 3 is a schematic top view of the movable elements of the gyroscopic sensor of FIG. 2.

FIG. 4 is a schematic top view of the fixed elements of the gyroscopic sensor of FIG. 2.

FIG. 5 is a schematic top view of the drive system of the gyroscopic sensor of FIG. 2.

FIG. 6 is a schematic top view of the sensing system of the gyroscopic sensor of FIG. 2.

FIGS. 7A–7C are schematic illustrations of the motion of the proof mass under the influence of the Coriolis acceleration and quadrature error.

FIG. 8A is a schematic circuit diagram of an integrator used to measure the position of the proof mass in the gyroscopic sensor of FIG. 2.

FIG. 8B is a schematic circuit diagram in which the integrator of FIG. 8A is replaced by a voltage buffer.

FIG. 8C is a schematic circuit diagram in which the integrator of FIG. 8A uses a subthreshold metal oxide semiconductor field effect transistor.

FIG. 9 is a schematic illustration of the signal processing circuitry of a gyroscopic sensor according to the present invention.

FIG. 10 is a photograph of a fabricated gyroscopic sensor.

FIG. 11 is a graph illustrating the response of the gyroscopic sensor to rotation about the Z-axis.

FIG. 12 is a graph illustrating the response of the Y-axis resonant frequency to an applied bias voltage.

FIG. 13 is a graph illustrating the response of the quadrature error to an applied voltage differential.

FIG. 14 is a schematic top view of a microfabricated dual-mass gyroscopic sensor according to the present invention.

FIG. 15 is a schematic top view of a proof mass of the gyroscopic sensor of FIG. 14.

FIG. 16A is a schematic illustration of a hairpin suspension of the gyroscopic sensor of FIG. 14.

FIG. 16B is a schematic illustration of a coupling spring of the gyroscopic sensor of FIG. 14.

FIG. 17 is a schematic top view of the drive system of the gyroscopic sensor of FIG. 14.

FIG. 18 is a schematic circuit diagram of the drive system of the gyroscopic sensor of FIG. 14.

FIG. 19 is a schematic circuit diagram of the sensing system of the gyroscopic sensor of FIG. 14.

DETAILED DESCRIPTION

Referring to FIG. 1, a Z-axis vibratory rate gyroscope functions by generating and sensing Coriolis acceleration. The functional operation of the Z-axis vibratory rate gyroscope of the present invention is illustrated by an equivalent spring-mass system. In a vibratory rate gyroscope 10, a proof mass 12 is supported by a flexible suspension 14 from a rigid frame 16. Proof mass 12 is oscillated along the X-axis (the drive mode) by a drive force $F_D$ as the frame rotates about the Z-axis. The combination of rotation and oscillation generates a Coriolis force $F_c$ along the Y-axis on the oscillating proof mass. The Coriolis acceleration is detected as a deflection of the proof mass along the Y-axis (the sense mode).

Referring to FIG. 2, a micromachined gyroscopic sensor 20 designed according to the present invention includes microelectromechanical sense element or proof mass 22 connected to a rigid frame or substrate 24. The gyroscopic sensor 20 measures the Z-axis vibratory rate, i.e., the rotation of the substrate about the axis normal to the micromachined surface 26 of substrate 24. The micromachined gyroscopic sensor 20 includes three major elements: a suspension system 30, a drive system 32 used to sustain oscillation of proof mass 22 along the X-axis, and a sensing system 34 used both to detect deflections of proof mass 22 along the Y-axis and to apply electrostatic forces to cancel any quadrature error, as will be described in detail below.

Referring to FIG. 3, suspension system 30 may be formed integrally with proof mass 22. Suspension system 30 supports the proof mass so that it may vibrate in a plane parallel to surface 26. Suspension system 30 holds proof mass 22, for example, about two microns above the surface of the substrate. The total mass of proof mass 22 may be about 0.1 to 0.3 micrograms. Suspension system 30 is generally H-shaped, with two parallel beams 40 and 42 positioned generally along the X-axis. Each beam may be about 500 to 1000 microns in length, specifically about 800 microns in length. The end of each beam is connected to an anchor 44 which connects the suspension system to the substrate (see FIG. 2).

The end of each beam 40, as shown in FIG. 2, may include a folded or J-shaped flexure 45 (see FIG. 3). Alternately, beams 40 and 42 may be linear.

Two beams or crossbars 46 and 48 connect beam 40 to beam 42. Crossbars 46 and 48 may be about eight-hundred microns long, and are positioned to trisect beams 40 and 42. Two cross-beams 50 and 52 connect crossbars 46 and 48. A third beam or crossbar 54 may connect the center of cross-beam 50 to the center of cross-beam 52. The flexible elements of suspension system 30 are constructed of polysilicon and, for example, have a width and a thickness on the order of two microns. The anchors may be about eight microns square.

The suspension system 30 is designed to be flexible along the X-axis and Y-axis, and as rigid as possible to other modes of vibration. In particular, the suspension system must be substantially rigid to rotation about the Z-axis, as small rotations may degrade the performance of the gyroscopic sensor. Large deflections may also result in the movable electrode fingers crashing into the stationary electrode fingers. The suspension system provides the necessary translational compliance while maintaining rotational rigidity by thickening the portions of beams 40 and 42 located between crossbars 46 and 48 to form trusses 41 and 43. Trusses 41 and 43 may have a width three to four times the width of the remainder of the beams, i.e., about six to eight microns. The portions of crossbars 46, 48 and 54 from which fingers project may have a width of approximately four microns.

The proof mass 22 also includes a plurality of finger electrodes (or simply fingers) which are used to drive and sense oscillations of proof mass along the X-axis and Y axis. A plurality of long fingers 38 project outwardly along the X-axis from crossbars 46 and 48, and a plurality of short fingers or stubs 39 project inwardly along the X-axis from crossbars 46, 48 and 54. The crossbars 46 and 48 form the spines, and long fingers 38 form the prongs of two movable sensing electrodes 56. Similarly, crossbars 46, 48 and 54 form the spines, and short fingers 39 form the prongs of two movable driving electrodes 58 and two movable feedback electrodes 59. The short fingers 39 may be about ten to twenty-five microns in length, specifically fifteen microns in length, whereas the long fingers 38 may be about one-hundred to two-hundred microns in length, specifically one-hundred and fifty microns in length.

Referring to FIG. 4, one or more stationary driving electrodes, one or more stationary feedback electrodes, and one or more stationary sensing electrodes may be rigidly connected to substrate 24. For example, two stationary driving electrodes 60a, 60b may be arranged relative to each other in an opposing configuration. Similarly, two stationary feedback electrodes 61a, 61b may face each other in an opposing configuration. Each stationary driving electrode 60a, 60b and each stationary feedback electrode 61a, 61b includes a plurality of short fingers 66. Stationary driving and feedback electrodes 60a, 60b and 61a, 61b may have a few to dozens of fingers. Short fingers 66 may have a length of approximately 15 microns and a width of approximately three to six microns. The width, for example, may be four microns.

Two stationary sensing electrodes 62a, 62b may face each other in an opposing configuration. Stationary sensing electrodes 62a, 62b include a plurality of long fingers 70. Each long finger 70 protrudes from a base 72. The fingers of stationary sensing electrode 62a are arranged in pairs, each pair including a right finger 74a and a left finger 76a. Similarly, the fingers of stationary electrode 62b are arranged in pairs, each pair including a right finger 74b and a left finger 76b. Each long finger 70 may be approximately one hundred and fifty microns in length, and have a width of approximately four microns.

Referring to FIG. 5, drive system 32 includes movable and stationary driving electrodes 58 and 60a, 60b, and movable and stationary feedback electrodes 59 and 61a, 61b. One set of short fingers 39 is interdigitated with short fingers 66 of stationary driving electrodes 60a, 60b. Another set of short fingers 39 is interdigitated with short fingers 66 of stationary feedback electrodes 61a, 61b. Short fingers 39 of movable electrodes 58 and 59, and short fingers 66 of stationary electrodes 60a, 60b and 61a, 61b may be formed from the same layer of polysilicon prior to the removal of the sacrificial layer so that the fingers may be co-planar.

The driving electrodes of drive system 32 act as electrical-mechanical transducers. By the application of an alternating voltage between stationary driving electrodes 60a, 60b and movable driving electrodes 58, proof mass 22 may be forced to oscillate or reciprocate along the X-axis. The motion along the X-axis induces bending in crossbars 46 and 48 so that proof mass 22 may move toward and away from stationary driving electrodes 60a, 60b. A more detailed explanation of the manner of operating drive system 32 in order to sustain oscillations in proof mass 22 may be found in U.S. Pat. No. 5,025,346, issued Jun. 18, 1991 to Tang et al., entitled Laterally Driven Resonant Microstructures, and assigned to the assignee of the present invention, the entire disclosure of which is incorporated herein by reference; and in U.S. Pat. No. 5,491,608, issued Feb. 13, 1996 to Nguyen, entitled Q-Controlled Microresonators and Tunable Electronic Filters Using Such Resonators, and assigned to the assignee of the present invention, the entire disclosure of which is incorporated herein by reference.

Referring to FIG. 6, sensing system 34 includes stationary sensing electrodes 62a, 62b and movable sensing electrodes 56. The long fingers 38 of movable sensing electrodes 56 and long fingers 70 of stationary sensing electrodes 62a, 62b are interdigitated, with each long finger 38 disposed between a right finger 74a, 74b and a left finger 76a, 76b of sensing electrodes 62a, 62b. The spacing, $Y_o$, between fingers 70 and fingers 38 may be approximately one micron. Fingers 38 and 70 may be formed from the same layer of polysilicon so that the fingers are co-planar. Thus all of the driving and sensing elements may be formed in the same fabrication step. In addition, the driving mode and the sensing mode operate in the X-Y plane parallel to the surface of substrate 24. As will be described in more detail below, sensing system 34 is used to sense the deflection of proof mass 22 along the Y-axis, to apply electrostatic forces to balance and eliminate the effect of quadrature error, and to tune the resonant frequency of Y-axis vibrations of the proof mass.

As discussed above, drive system 32 causes proof mass 22 to oscillate along the X-axis. The position of the proof mass along the X-axis, x(t), is given by the following equation:

$$x(t) = X_0 \sin \omega_x t \qquad (1)$$

where $X_o$ is the amplitude of the oscillation and $\omega_x$ is the frequency of the driving voltage (and thus the oscillation frequency). The frequency of the driving voltage, $\omega_x$, may be between 7 kHz and 100 kHz, and the driving voltage may be sufficient to cause the proof mass to undergo a maximum deflection, $X_o$, of about one micron. The magnitude of the Coriolis acceleration, $\ddot{y}_{Coriolis}$, is given by the following equation:

$$\ddot{y}_{Coriolis} = 2 \cdot \Omega_z(t) \times \dot{x}(t) \qquad (2)$$

where $\Omega_z(t)$ is the rate of rotation of the proof mass about the Z-axis and $\dot{x}$ is the velocity of the proof mass along the X-axis. Equations 1 and 2 may be combined as follows:

$$\ddot{y}_{Coriolis} = 2 \cdot \Omega_z(t) \cdot X_0 \cdot \omega_x \cdot \cos\omega_x(t) \qquad (3)$$

For a gyroscopic sensor with an oscillation amplitude $X_0=1$ µm, on oscillation frequency $\omega_x=20$ kHz, and an input rotation rate $\Omega_x=1$ deg/sec, the Coriolis acceleration has a magnitude of 0.45 milliG's.

The Coriolis acceleration is an amplitude-modulated signal in which the carrier frequency is the oscillation frequency and the rotation rate modulates the amplitude. The resulting Coriolis acceleration is a dual sideband signal centered on the oscillation frequency. Referring to FIG. 7A, since the Y-axis accelerations are proportional to velocity, the motion of proof mass 22 is elliptical. The maximum deflection of proof mass 22 along the Y-axis will be a few nanometers. The deflection detectable by gyroscopic sensor 20 may be on the order of a picometer.

In an ideal device, the moving electrodes are perfectly aligned with the stationary electrodes so that the only motion caused by drive system 32 is along the X-axis. However, one effect of manufacturing flaws is quadrature error. Referring to FIG. 7B, quadrature error occurs if proof mass 22 oscillates along an axis that is not exactly parallel to the X-axis. If this is the case, then there is some small fraction, $\epsilon$, of the drive oscillation, X(t), which lies along the Y-axis. This quadrature displacement along the Y-axis is given by the following equation:

$$y_{Quadrature} = -\epsilon \cdot x(t) \qquad (4)$$

If this displacement is differentiated twice, the acceleration, $\ddot{y}_{Quadrature}$, due to off-axis oscillation can be determined. This acceleration, given in Equation 5 below, is referred to as quadrature error.

$$\ddot{Y}_{Quadrature} = \epsilon \cdot X_0 \cdot \omega_x^2 \cdot \sin\omega_x t \qquad (5)$$

Note the similarity between the quadrature error and the Coriolis acceleration: both are sinusoidal signals centered at the frequency of oscillation. However, the signals can be distinguished by their phase relative to the driven oscillation. Specifically, the Coriolis acceleration is ninety degrees out of phase relative to the drive oscillation, $\omega_x$, whereas the quadrature error is in phase with the driven oscillation.

The quadrature error can be quite large. In fact, the quadrature error may easily exceed the Coriolis acceleration.

The ratio of quadrature error and Coriolis acceleration is given by Equation 6:

$$\frac{\ddot{y}_{Coriolis}}{\ddot{y}_{Quadrature}} = \frac{2\Omega_z(t) \cdot X_0 \cdot \omega_x}{\epsilon \cdot X_0 \cdot \omega_x^2} = \frac{2\Omega_z(t)}{\epsilon \cdot \omega_x} \qquad (6)$$

Using the previous example of an input rotation rate, $\Omega_z$, of 1 deg/sec and an oscillation frequency, $\omega_x$, of 20 kHz, for the quadrature error to be as small as the Coriolis acceleration, the oscillation direction must be accurate to a factor of 1 part in 3.6 million. Due to manufacturing flaws and other imbalances, the quadrature error may be considerably larger than this. Accordingly, gyroscopic sensor 20 has a mechanism to reduce, or nullify the quadrature error.

Microfabricated gyroscopic sensor 20 may apply electrostatic forces to proof mass 22 through sensing system 34. By selection of the proper electrostatic force, the quadrature error may be nullified. As shown by Equation 5, the quadrature error is directly proportional to position of the proof mass along the X-axis. To cancel this error signal without effecting the Coriolis signal, a balancing force must be applied that is also directly proportional to the position of the proof mass along the X-axis. Gyroscopic sensor 20 applies such a balancing force, using the interdigitated Y-axis position sense fingers.

Referring to FIG. 7C, proof mass 22 is shown with two fingers 38a and 38b projecting from opposite sides of the proof mass. Finger 38a is surrounded by right and left fingers 74a and 76a, whereas finger 38b is surrounded by right and left fingers 74b and 76b. A small voltage differential, 2ΔV, is applied between the right finger 74a and left finger 76a. The opposite voltage potential −2ΔV, may be applied between right finger 74b and left finger 76b. This voltage difference creates a balancing force, $F_y$, which counteracts the quadrature error. The balancing force acts on proof mass 22 so that, absent the Coriolis force, fingers 39 vibrate solely along the X-axis. As mentioned above, the balancing force needs to be exactly proportional to the position of the proof mass along the X-axis. An electrostatic force between two charged surfaces is proportional to the overlapping area of the surfaces. Because the overlapping area between fingers 38 and fingers 70 is directly proportional to the position of proof mass 22 along the X-axis, as proof mass oscillates, the position sense capacitors change proportionately. Therefore, the electrostatic balancing force $F_y$ will also be proportional to the position of proof mass 22. Sensing system 34 applies a DC bias voltage $V_{DC}$ to fingers 74a, 74b, 76a and 76b and a voltage differential ZΔV between fingers 74a, 74b and 76a, 76b given by Equation 7 below:

$$F_y = \frac{C_{overlap}}{y_0} x(t) \cdot ((V_{DC} + \Delta V)^2 - (V_{DC} - \Delta V)^2) \qquad (7)$$

$$= 2\frac{C_{overlap}}{y_0} V_{DC} \Delta V \cdot x(t)$$

where $C_{overlap}$ is the maximum change in capacitance between fingers 70 and fingers 38 as the structure oscillates and $y_0$ is the equilibrium distance between fingers 70 and fingers 38.

By properly selecting the voltage differential ΔV, the quadrature error may be significantly reduced, e.g., by a factor ten to one-hundred. The proper voltage difference may be calculated from Equations (7) and (5) and Newton's law F=ma, as follows:

$$\Delta V = M \frac{\varepsilon y_0 \omega_x^2}{V_{DC} C_{overlap}} \qquad (8)$$

where M is the mass of proof mass 22. Because the quadrature error is a result of manufacturing defects, the proper voltage differential depends upon the specific structure and may vary from device to device. A voltage differential in the range of 1 mV to 100 mV should be appropriate. The optimum voltage differential to cancel the quadrature error may be determined experimentally (see FIG. 13 which is discussed below).

In addition to canceling the quadrature error, sensing system 34 of gyroscopic sensor 20 may be used to match the Y-axis resonant frequency $\omega_y$ of proof mass 22 to the driving oscillating frequency $\omega_y$. Because gyroscopic sensor 20 is a high Q second order system, the response of proof mass 22 to Coriolis acceleration can be enhanced. As shown by Equation 3, the Coriolis acceleration is a signal centered around the oscillation frequency $\omega_x$. Therefore the relative values of the oscillation frequency $\omega_x$ and the Y-axis resonant frequency $\omega_y$ have a dramatic effect on the response of the sense mode and hence the sensor sensitivity. If the Y-axis resonant frequency is matched to the oscillation frequency, the device may experience a gain of Q in the system response. However, the bandwidth of the sensor is then limited to $\omega_y/Q$. Given that system is run in a vacuum and Q is typically greater than 10,000, the system bandwidth for $\omega_x=\omega_y$ will be only a few Hertz.

For larger bandwidth and increased sensitivity, gyroscopic sensor 20 is operated with a slight mismatch between resonant frequency $\omega_y$ and oscillation frequency $\omega_x$. The system response of Y-axis displacement due to Coriolis acceleration is given by:

$$\frac{y}{\Omega_z} = \frac{2X_0\omega_x \sin\omega_x t}{\omega_y^2 + \frac{j\omega_x\omega_y}{Q} - \omega_x^2} = \frac{X_0\omega_x}{\omega_x\Delta\omega}\sin\omega_x t \quad (9)$$

Provided that there is a means to tune the Y-axis resonant frequency, it is desirable to operate the gyroscopic sensor with a 5–10% frequency mismatch, $\Delta\omega/\omega_x$, yielding a gain of 5–10 in sensitivity. For example, if $\omega_x$ is about 12 kHz, then $\omega_y$ may be set to about 12.5 kHz. Alternately, the frequency mismatch may be reduced to about 1–2%. Reducing the mismatch further might increase the sensitivity but may be difficult to maintain for any length of time because the resonant frequency changes as the temperature of the gyroscopic sensor changes.

Tuning of the Y-axis resonant to improve sensitivity is accomplished using electrostatic "negative" springs, i.e., by applying a DC bias voltage, $V_{DC}$, between proof mass 22 and stationary sensing electrodes 62. When the DC voltage is established between the moving proof mass and the stationary sensing electrode, the resulting attractive force reduces the total spring constant and thus adjusts the resonant frequency.

Using a first-order model for the parallel-plate capacitors, the linearized spring force due to electrostatic forces is given by:

$$F_y = \left[\frac{1}{(y_0-y)^2} - \frac{1}{(y_0-y)^2}\right]\frac{y_0 C_s V_{DC}^2}{2} \quad (10)$$

where y is the deflection of the proof mass along the Y-axis away from its equilibrium position.

The Y-axis resonant frequency, $\omega_y$, is given by the following equation:

$$\omega_y = \sqrt{\frac{k_y + k_e}{M}} \quad (11)$$

where $k_y$ is the purely mechanical spring constant, $k_e$ is the electrostatic spring constant and M is the mass of proof mass 22. The mechanical spring constant $k_y$ is primarily a function of the stiffness of suspension system 30.

The electromagnetic spring constant, $k_e$, is given by the following equation:

$$k_e = -2\frac{C_s}{y_0^2}V_{DC}^2 \quad (12)$$

in which $C_s$ is the sense capacitance of the gyroscopic sensor and $y_o$ is the distance between fingers 38 and 70 (see FIG. 7A). $C_s$ depends upon the total number of fingers and the amount of overlapping area, and should be at least 30 femtoFarads (fF). By increasing the number of fingers, $C_s$ may be increased to about one picoFarad (pF). As mentioned above, the spacing $y_o$ between fingers is about one micron. It may be noted that $k_e$ has a negative value, so that as $V_{DC}$ is increased $\omega_y$ is decreased. The system starts with $\omega_y$ larger than $\omega_x$, and the bias voltage $V_{DC}$ is increased, thereby reducing $\omega_y$, until the desired mismatch $\Delta\omega/\omega_y$ is achieved. The correct valve for $V_{DC}$ may be determined experimentally (see FIG. 12 which is discussed below), but should be in the range of one to ten volts.

In addition to canceling the quadrature error and adjusting the Y-axis resonant frequency, sensing system 34 may be used to negate the effects of centrifugal or centripetal force. As the gyroscope sensor rotates about the Z-axis, a centrifugal force will push the proof mass outwardly (assuming the axis of rotation does not pass exactly through the center of mass of the proof mass). A voltage difference, $V_c$, may be applied between the opposing stationary sensing electrodes 62a and 62b. Because the centripetal force varies at a low frequency, compared to the frequencies of the Coriolis force, a high pass filter may be used to remove the effect of the centripetal force from the output.

Gyroscopic sensor 20 measures the position of proof mass 22 along the Y-axis by capacitive deflection sensing. The interdigitated fingers of sensing system 34 (shown in FIG. 2) are used to sense deflection of the proof mass along the Y-axis. The fingers are arranged in a capacitor bridge so that any deflection of the proof mass results in measurable changes in the relative size of the capacitors. In a first order model, the capacitance of a parallel-plate capacitor is inversely proportional to the distance between the plates.

Referring to FIGS. 6 and 8A, the space between finger 38 of movable sensing electrode 56 and right fingers 74a, 74b of sensing electrodes 62a, 62b forms a first capacitor $C_1$, and the space between finger 38 and left fingers 76a, 76b forms a second capacitor $C_2$. As movable sensing electrode 56 is deflected along the Y-axis, $C_1$ and $C_2$ change. For example, if sensing electrode 56 is deflected leftward, the distance between finger 38 and right fingers 74a, 74b increases, thereby decreasing $C_1$, while the distance between finger 38 and left fingers 76a, 76b decreases, thereby increasing $C_2$. The change in capacitance is detected by a position sensor 80, such as an integrator or voltage buffer, which includes an amplifier 82. Finger 38 is connected to the negative input of amplifier 82. The output of amplifier 82 is connected to the negative input of the amplifier via an integrating capacitor 84 to form an integrator. The negative input of amplifier 82 is connected to ground via a parasitic capacitor 83. The positive input of amplifier 82 may be connected directly to ground.

Because capacitance cannot be measured with a DC voltage, a voltage source 90 applies an AC voltage $V_S$ between fingers 74a, 74b and 76a, 76b. The voltage $V_S$ is about 0.1 to 5.0 volts, preferably about one volt, and has a frequency much higher than the driving frequency $\omega_x$. For example, the frequency of voltage source 90 may be about one megahertz.

The integrator shown in FIG. 8A offers the flexibility of trading bandwidth for sensitivity by varying the integrating capacitor size. The integrator also provides lower distortion. Some of the parasitic capacitors involved in microelectromechanical systems are nonlinear which will vary the gain of a buffer and thereby result in distortion, and the practice of bootstrapping parasitic capacitance is a form of positive feedback which exacerbates amplifier distortion. However, because the integrator uses a fixed, linear capacitor, distortion is kept to a minimum.

Another common amplifier configurations used for capacitive position sensing is shown in FIG. 8B, in which the output of amplifier 82 is connected to its negative input and sensing electrodes 56 are connected to the positive input of the amplifier to form a voltage buffer.

Unfortunately, the integrator presents a difficult biasing problem. Ideally, biasing can be performed by placing a very large resistor in parallel with the integrating capacitor. However, any practical implementation of a large resistor results in a considerable parasitic capacitance. A diode can also be used in parallel with the integrating capacitance; however, that adds a nonlinear capacitance to the integrating capacitance resulting in distortion. Referring to FIG. 8C, this biasing problem has been solved by using a subthreshold metal oxide semiconductor field effect transistor (MOSFET) 88. The MOSFET device is connected in parallel with integrating capacitor 84 so that the source of MOSFET 88 is connected to the output of amplifier 82, the drain is connected to the negative input of amplifier 82, and the gate is connected to ground. The negative input of amplifier 82 may be connected to ground by a diode 86, and the positive input of amplifier 82 may be connected directly to ground. In the subthreshold regime, the MOSFET device exhibits extremely low transconductance and no source-to-drain capacitance. The use of subthreshold MOSFET device has resulted in a well behaved integrator operable down to 1 kHz with a 50 F integrating capacitor without additional noise or distortion attributable to the bias circuitry.

Referring to FIG. 9, gyroscopic sensor 20 includes a phase-locked loop (PLL) 100 and several synchronous demodulators or mixers to perform signal processing. Phase-locked loop 100 produces extremely accurate digital signals having a driving frequency $\omega_x$ between about 7 kHz and 100 kHz. The drive frequency, $\omega_x$, may be generated by dividing down the signal from voltage source 90. The phase-locked loop ensures that the position signals are exactly in phase with the position of proof mass 22. Phase-locked loop 100 may also generate a velocity signal on line 108 which is exactly ninety degrees out of phase with a position signal on line 110. Position signals on lines 102 and 104, having opposite amplitudes, are supplied by phase-locked loop 100 to the positive and negative outputs, respectively, of a transresistance amplifier 106. Opposing stationary drive electrodes 60a and 60b are also connected to the positive and negative outputs of transresistance amplifier 106. Opposing feedback electrodes 61a and 61b are connected to the positive and negative inputs of transresistance amplifier 106. One of the outputs of transresistance amplifier 106 is mixed with the velocity signal by a mixer 112. The combined output of mixer 112 is applied to trans-resistance amplifier 106 to provide an automatic gain control (AGC) circuit to control the amplitude of the oscillations of proof mass 22 along the X-axis. The phase accuracy of the phase-locked loop is critical to the operation of gyroscopic sensor 20 because any phase error will result in cross-talk between the Coriolis and quadrature signals. Assuming that a phase error $\theta_n(t)$ is generated by phase noise in the phase-locked loop, the error in the rotation rate $\Omega$ may be derived as shown in Equations 13–15 below:

$$y(t) = \left[\frac{X_0\omega_x}{\omega_x\Delta\omega}\Omega\cos\omega t + Y_{Quadrature}\sin\omega t\right] \quad (13)$$

$$\Omega_{est} = \frac{\omega_x\Delta\omega}{X_0\omega_x}y(t)\cos(\omega_x t + \theta_n(t)) \quad (14)$$

$$\Omega_{est} = \Omega + \frac{\omega_x\Delta\omega}{X_0\omega_x}Y_{Qadrature}\theta_n(t) + \text{Higher terms} \quad (15)$$

Because phase-locked loop 100 is extremely accurate, phase noise is minimized and variable cross-talk is extremely small. In addition, quadrature error correction reduces cross talk and phase noise.

The nulling of the quadrature error, the tuning of the Y-axis resonant frequency, and the balancing of the centrifugal forces is accomplished by the application of the proper voltages to fingers 70 of opposing stationary sensing electrodes 62a and 62b. Specifically, gyroscopic sensor 20 includes four DC bias voltage sources 120, 122, 124 and 126. Voltage source 120 applies a total voltage $V_t = V_{DC} + \Delta V + V_C$ to right fingers 74a of sensing electrode 62a. Voltage source 122 applies a total voltage of $V_{DC} - \Delta V - V_C$ to left fingers 76a. Voltage source 124 applies a total voltage of $V_{DC} - \Delta V + V_C$ to right electrode fingers 74b of sensing electrode 62b. Voltage source 126 applies a total voltage of $V_{DC} + \Delta V - V_C$ to left fingers 76b. Thus, voltage sources 120, 122, 124 and 126 provide all of the necessary bias voltages in order to nullify the quadrature error, select the desired Y-axis resonant frequency, and cancel any centrifugal or other low-frequency forces. Of course, any other combination of voltage sources providing the same effective total voltage to the fingers of the sensing electrodes could be used. Also, the voltages could be applied by different sets of fingers of the stationary sensing electrode, for example, $V_{DC}$ could be applied by one set of fingers and $\Delta V$ could be applied by another set of fingers.

In order to extract the position, Coriolis effect, and quadrature signals from capacitive position sensor 80, the signal from amplifier 82 is boosted by an oscillation amplifier 130 to produce an output signal on line 132. This output signal may be mixed with signals from a modulator or clock and the position and velocity signals from phase locked loop 100. Voltage source 90 may produce a high frequency, e.g., one megahertz clock signal on line 134. To generate the position signal, this clock signal is mixed with the output signal on line 132 by a mixer 136. In order to produce the Coriolis signal, the clock signal on line 134 is mixed with the velocity signal on line 108 by a mixer 140 to produce a combined signal on line 142. The combined signal on line 142 is then mixed with output signal on line 132 by a mixer 144 to produce the Coriolis signal. Finally, to produce the quadrature signal, the clock signal on line 134 is mixed with the position signal on line 110 by a mixer 150 to produce a combined signal on line 152. The combined signal on line 152 is then mixed with output signal on line 132 by a mixer 154 to produce the quadrature signal. The position, Coriolis and quadrature signals may be passed through low pass filters to filter out high frequency components.

Referring to FIG. 10, a gyroscopic sensor 20 was fabricated on a silicon substrate 24 using a combination of metal oxide semiconductor and microelectromechanical fabrication techniques. The transresistance amplifier and integrator were fabricated on the same die, and the remaining electronics was implemented off of the chip. The mechanical sensing element is about one millimeter across.

There are a number of possible noise sources in gyroscopic sensor 20. Principal among these are: Brownian noise, op-amp noise in the integrator, and phase locked loop phase noise. The Brownian noise, $\Omega_n B$, represents the fundamental limit on angular rate resolution and is given by:

$$\Omega_{nB} = \sqrt{\frac{kT\omega_y BW}{MQ\omega_x^2 X_0^2}} \quad (16)$$

where k is Boltzman's constant, T is the temperature, M is the mass of the proof mass, BW is the bandwidth of the gyroscopic sensor, and Q is the quality factor. As an example, consider a gyroscopic sensor with mass, M=0.2 µg, an oscillation amplitude $X_0$=1 µm, a quality factor, Q=10,000, a bandwidth BW=100 Hz, a drive frequency $\omega_x$=20 kHz and a resonant frequency $\omega_y$=20 kHz. For this example, we find a Brownian noise floor $\Omega_{nB}$=0.06 deg/sec. Because the gyroscopic sensor is run in vacuum and has a high Q, Brownian noise is not the dominant noise source.

As shown by Equation 15, phase noise in the phase locked loop, represented by $\theta_n(t)$, can cause variable cross talk between quadrature and Coriolis signals. In gyroscopic sensor 20, this effect is kept to a minimum due to the low phase noise in the phase locked loop and nulled quadrature error.

The integrator op-amp noise is the dominant noise source in gyroscopic sensor 20. The input-referred noise, $\Omega E$, of the op-amp noise is a function of the total capacitance, $C_T$, attached to the summing node of the integrator, and is given by:

$$\Omega_{nE} = \frac{C_T y_0 v_n}{C_S X_0 V_S} \Delta\omega \sqrt{2BW} = \frac{y_0 \Delta\omega}{X_0 V_S} \sqrt{\frac{32kTBW}{3\pi C_S f_T}} \quad (17)$$

where $f_T$ is the maximum operable frequency of the transistors in gyroscopic sensor 20. The electronic noise is at best $\Omega_{nE}$=0.08 deg/sec for a modest CMOS process with $f_T$=250 MHZ, a frequency mismatch $\Delta\omega$=1 kHz, a sense voltage $V_s$=1 volt, a sense capacitance $C_s$=100 fF, and the oscillation amplitude and finger spacing $X_0=y_o$=1 µm.

An initial characterization of the gyroscopic sensor response is shown in FIG. 11. FIG. 11 is a graph of the logarithm of the output voltage of the Coriolis signal, on the Y-axis, as a function of frequency, on the X-axis. The graph was produced by measuring the output Coriolis signal in response to a 1 Hz, 5 deg/sec sine wave rotation. The gyroscopic sensor was operated with an oscillation frequency, $\omega_x$, of 12 kHz and a Y-axis resonant frequency, $\omega_y$, of about 12.5 kHz. The noise floor for this version of Z-axis vibratory rate gyroscopic sensor is 1 deg/sec/Hz$^{1/2}$.

Referring to FIG. 12, there is a measured mechanical resonant frequencies of proof mass 22 as a function of the DC bias voltage applied to the position sense fingers. FIG. 12 shows a graph of the resonant frequencies of proof mass 22 (on the Y-axis of the graph) as a function of the RMS voltage (on the X-axis of the graph) applied between fingers 38 and fingers 70. The RMS voltage is a combination of the DC bias voltage and the AC voltage generated by voltage source 90. The resulting electrostatic springs reduce the resonant frequency of the sense mode ($\omega y$), raise the resonant frequencies of the out-of-plane modes, and leaves the driven mode ($\omega_x$) unaffected. As expected, the Y-axis resonant frequency drops as the bias voltage is increased and the oscillation frequency of proof mass 22 remains constant at 12 kHz. The resonant frequencies of the vertical and tipping modes increase with DC bias due to electrostatic levitation effects.

As discussed above, gyroscopic sensor 20 includes a means to null quadrature error. FIG. 13 shows a graph of the measured voltage, $V_{out}$ on the Y-axis, as a function of the voltage differential, $\Delta V$, on the X-axis, which is applied between right fingers 74a, 74b and left fingers 76a, 76b. Both the quadrature and rotation rate signals were plotted for a zero rotation rate as $\Delta V$ was adjusted. Measurements of the quadrature error and rotation rate signals demonstrate that the quadrature error signal can be controlled independently of the Coriolis signal.

Referring to FIG. 14, a dual-mass gyroscopic sensor 200 includes a first proof mass 202 and a second proof mass 204, both connected to a rigid frame or substrate 206 (not shown in FIG. 14, but illustrated in FIG. 16A) by a suspension system 208 and generally having substantially identical mass. Each proof mass can include four bars, e.g., a left bar 201a, a right bar 201b, a lower crossbar 203a, and an upper crossbar 203b, connected in a rectangle. First and second proof masses 202 and 204 are connected to each other by a coupling system 210.

Dual-mass gyroscopic sensor 200 further includes a drive system 212 to vibrate first proof mass 202 and second proof mass 204 in opposing directions along a drive axis (e.g., the X-axis), i.e., to vibrate first proof mass 202 and second proof mass 204 antiphase (antiparallel) to each other, and a sensing system 214 to detect the displacement of the first and second proof masses along a sense axis (e.g., the Y-axis). The displacement of the proof masses along the sense axis results from a Coriolis force generated by rotation of the vibrating proof masses about a Z-axis which is perpendicular to the X-Y plane or the surface of the substrate. Because the first and second proof masses vibrate in an antiphase mode, the Coriolis force exerts opposite forces along the sense axis on the two proof masses.

Referring to FIGS. 14 and 16A, suspension system 208 includes a plurality e.g., eight, of hairpin suspension elements 216, having substantially identical structures. Each proof mass is supported by four hairpin suspension elements 210, two each on the left side and right side of the proof mass. Each hairpin suspension element 216 includes a first connecting portion 218 with one end attached to substrate 206, a second connecting portion 220 with one end attached to the proof mass (not shown), and a suspension beam 222 extending outward from the two connecting portions 218 and 220. First and second connecting portions 218 and 220 generally are aligned linearly and in parallel with the sense axis. First connecting portion 218 and second connecting portion 220 have substantially the same dimension a, e.g., 100 µm (micrometers), along the sense direction to provide a symmetry to the suspension system. Suspension beam 222 includes two bars 222a and 222b generally perpendicular to the connecting portions, and a short crossbar 222c connecting bars 222a and 222b generally parallel to the connecting portions. Each bar 222a and 222b has length b, e.g., 100 µm (micrometers), and crossbar 222c has a length c, e.g., 2 µm (micrometers). The length c is typically set to the minimum allowable length for flexible a suspension system, i.e., c<<a, b. The dimensions a, b and c may vary according to a fabrication process used. In addition, the ratio of drive and sense frequencies may be set by choosing an appropriate ratio a/b since the spring constants $k_x$ and $k_y$ are inversely proportional to a and b.

Referring to FIGS. 14 and 16B, coupling system 210 includes a first coupling spring 224 and a second coupling spring 226 which have substantially identical structures, connecting first mass 202 to second mass 204. The coupling springs are typically larger than the hairpin suspension elements, but may be constructed similarly. Specifically, each coupling spring includes a first linear portion 228 with one end attached to first mass 202, and a second linear portion 230 with one end attached to second mass 204, and a coupling beam 232 extending outwardly from the two linear portions 228 and 230. The coupling spring is generally more flexible than the hairpin suspension and may be used to set difference in natural frequencies between the parallel and antiparallel the drive and sense modes.

Referring to FIG. 17, drive system 212 includes a plurality of stationary driving electrodes and a plurality of stationary feedback electrodes, both connected to the substrate. The drive system further includes crossbars 203a and 203b of the first and second proof masses. The driving electrodes include a first driving electrode 234 positioned above the upper crossbar of first mass 202, and a second driving electrode 236 positioned below the lower crossbar of second mass 204. The driving electrode may further include a third driving electrode 238 positioned below first driving electrode 234 and above lower crossbar 203a of the first mass, and a fourth driving electrode 240 positioned above second driving electrode 236 and below upper crossbar 203b of the second mass, to provide additional driving force to the first and second masses 202 and 204. Each driving electrode includes a plurality of drive fingers 242 extending toward the crossbar adjacent thereto. Similarly, each crossbar includes a plurality of drive fingers 244 extending toward the driving electrode adjacent thereto. Drive fingers 242 of the driving electrodes are interdigitated with drive fingers 244 of the crossbar.

Drive system 212 further includes an AC voltage source 245 coupled to driving electrodes 234, 236, 238 and 240, and a DC voltage source 247 coupled to crossbars 203a and 203b of the first and second masses. AC and DC voltage sources 226 and 228 together provide the necessary force to vibrate first and second proof masses 202 and 204 along the drive axis. Typically the drive amplitude is around 5–10 μm to obtain a significant output signal.

The amplitude of motion in the drive direction is sensed by the stationary feedback electrodes. The stationary feedback electrodes include a first feedback electrode 246 positioned between third driving electrode 238 and upper crossbar 203b of the first mass, and a second feedback electrode 248 positioned between fourth driving electrode 240 and lower crossbar 203a of the second mass. Each feedback electrode includes a plurality of feedback fingers 250 extending toward the crossbar adjacent thereto. Similarly, each crossbar includes a plurality of feedback fingers 252 extending toward the feedback electrode adjacent thereto. Feedback fingers 250 of the feedback electrodes are interdigitated with feedback fingers 244 of the crossbars in an alternating arrangement.

Referring to FIG. 18, the electronic devices involved in drive system 212 include a transresistance amplifier 254 or a Pierce circuit whose input is coupled to feedback electrodes 246 and 248. The vibrational motion of first and second proof masses 202 and 204 generates a current id within the feedback electrodes. Amplifier 254 receives the current $i_d$ and outputs a signal. An amplifier 256 receives and amplifies the output signal by a fixed gain to compensate for a damping effect of the moving structures. A gain controller 258 receives the amplified signal and readjusts the gain to ensure a desired voltage $v_d$ is consistently applied to drive electrodes 234, 236, 238 and 240 to maintain a desired drive amplitude at the antiparallel-mode resonant frequency. Gain controller 258, in turn, is controlled by an automatic gain control detector 260 which receives as an input the output signal of transresistance amplifier 254.

Referring to FIG. 19, sensing system 214 has substantially identical structures and operates similarly to the sensing system of gyroscopic sensor 20. As in gyroscopic sensor 20, sensing system 214 includes stationary sensing electrodes 262 and 264 connected to the substrate, lower crossbar 203a of the first mass and upper crossbar 203b of the second mass. Each sensing electrode includes a plurality of left sense fingers 266 and a plurality of right sense fingers 268. Each crossbar includes a plurality of sense fingers 266, each extending between its respective left sense finger and right sense finger. Sensing system 214 may use the same position sensor 80 of gyroscopic sensor 20, such as an integrator or voltage buffer to measure the deflection of the proof masses along the sense axis. The deflection results from a Coriolis force generated in response to rotation of first and second masses 202 and 204 about the Z-axis. Since first proof mass 202 and second proof mass 204 vibrate in antiphase to each other, they deflect in opposing directions along the sense axis. Gyroscopic sensor 200, therefore, uses a difference deflection mode of first mass 202 and second mass 204 to determine the Coriolis force. That is, gyroscopic sensor 200 uses the difference of the signals generated in response to the deflections of first mass 202 and second mass 204 to determine the Coriolis force.

The difference mode deflection reduces or eliminates errors caused by common mode thermal drift and common mode acceleration. Common mode thermal drift occurs if temperature variations experienced by the gyroscopic sensor cause the two proof masses to deflect along the sense axis in the same manner. Common mode acceleration occurs if an external acceleration force on the gyroscopic sensor causes the proof mass to deflect along the sense axis. For example, if an external acceleration force is applied to gyroscopic sensor 200, first mass 202 and second mass 204 accelerates with substantially identical acceleration in substantially identical direction. However, by using the difference of the signals generated by first mass 202 and second mass 204 the effect of the external force on the two masses is canceled. Consequently noise and or errors generated by common mode effects are significantly reduced. Therefore, gyroscopic sensor 200 can be operated at lower frequencies without excessive noise from low frequency effects such as common mode thermal drift or common mode acceleration. Operating the gyroscopic sensor at a lower frequency allows use of a low spring constant, which allows easier amplification of the vibrational motion of the proof mass as well as a lower voltage mode tuning capability.

The present invention has been described in terms of a preferred embodiment. The invention, however, is not limited to the embodiment depicted and described. Rather, the scope of the invention is defined by the appended claims.

What is claimed is:

1. A microfabricated gyroscopic sensor to measure rotation about an input axis, comprising:

a substrate having a surface;

a first mass;

a second mass;

a coupling system connecting the first mass and the second mass;

a suspension system connecting the first mass and the second mass to the substrate;

a drive system to cause the first mass and the second mass to vibrate in an antiphase mode along a drive axis generally parallel to the surface of the substrate; and a position sensor to measure a displacement of the first mass and the second mass along a sense axis perpendicular to the drive axis and generally parallel to the surface of the substrate, wherein rotation of the first mass and the second mass about the input axis perpendicular to the surface of the substrate and vibration of the first mass and the second mass along the drive axis generates a Coriolis force to vibrate the first mass and the second mass along the sense axis in antiphase to each other.

2. The sensor of claim 1, further including a signal processor coupled to an output of the position sensor to generate a signal varying with the rate of rotation of the first mass and the second mass about the input axis.

3. The sensor of claim 1, wherein the first mass and the second mass have substantially the same mass.

4. The sensor of claim 1, wherein the suspension system includes a plurality of hairpin suspension elements.

5. The sensor of claim 4, wherein each hairpin suspension element has a first connecting portion joined to the substrate, a second connecting portion joined to the first mass or the second mass and a suspension beam which extends from the first connecting portion and the second connecting portion and being substantially perpendicular to the first and second connecting portions, the first and second connecting portion being substantially linearly aligned and parallel to the sense axis.

6. The sensor of claim 5, wherein the first connecting portion has a first length along the sense axis and the second connecting portion has a second length along the sense axis, the first length and the second length being substantially the same.

7. The sensor of claim 6, wherein the suspension beam has a width along the sense axis and a length along the drive axis where the width of the suspension beam is substantially less than the length of the first and second connecting portions and a height of the suspension beam.

8. The sensor of claim 4, wherein there are eight hairpin suspensions.

9. The sensor of claim 1, wherein the position sensor uses a difference deflection mode of the first mass and the second mass along the sense axis to measure the Coriolis force.

10. A microfabricated gyroscopic sensor to measure rotation about an input axis, comprising:
a substrate;
a first mass;
a second mass;
a coupling system connecting the first mass and the second mass;
a suspension system connecting the first mass and the second mass to the substrate;
a drive system to cause the first mass and the second mass to vibrate in an antiphase mode along a drive axis; and
a position sensor to measure a displacement of the first mass and the second mass along a sense axis perpendicular to the drive axis, wherein rotation of the first mass and the second mass about the input axis and vibration of the first mass and the second mass along the drive axis generates a Coriolis force to vibrate the first mass and the second mass along the sense axis in antiphase to each other;
wherein the coupling system includes a first coupling spring and a second coupling spring, each coupling spring having a first linear portion coupled to the first mass, a second linear portion coupled to the second mass, and a coupling beam perpendicularly extending outward from the first and second linear portions, the first and second linear portions being substantially linearly aligned and parallel to the drive axis.

11. The sensor of claim 10, wherein the first linear portion has a first length along the drive axis and the second linear portion has a second length along the drive axis, the first length and the second length being substantially the same.

12. The sensor of claim 11, wherein the coupling beam has a width along the drive axis and a length along the sense axis where the width of the beam is substantially less than the length of the beam and the length of the linear portions.

13. A microfabricated gyroscopic sensor to measure rotation about an input axis, comprising:
a substrate;
a first mass;
a second mass;
a coupling system connecting the first mass and the second mass;
a suspension system connecting the first mass and the second mass to the substrate;
a first drive electrode connected to the substrate;
a second drive electrode connected to the substrate and positioned substantially in parallel to the first drive electrode;
a first voltage source coupled to the first drive electrode and the second drive electrode to apply an alternating voltage to the first drive electrode and the second drive electrode, wherein the first mass and the second mass vibrate in opposing directions along a drive axis in response to alternating voltages being applied to the first and second drive electrodes by the first voltage source;
a second voltage source coupled to the first mass and the second mass to apply a DC voltage to the first mass and the second mass; and
a position sensor to measure a displacement of the first mass and the second mass along a sense axis perpendicular to the drive axis, wherein rotation of the first mass and the second mass about the input axis and vibration of the first mass and the second mass along the drive axis generates a Coriolis force to vibrate the first mass and the second mass along the sense axis in antiphase to each other.

14. The sensor of claim 13, wherein the drive system, further includes:
a first plurality of drive fingers projecting along the drive axis from the first drive electrode;
a second plurality of drive fingers projecting along the drive axis toward the first drive electrode from the first mass, the second plurality of drive fingers being interdigitated with the first plurality of drive fingers;
a third plurality of drive fingers projecting along the drive axis from the second drive electrode; and
a fourth plurality of drive fingers projecting along the drive axis toward the second drive electrode from the second mass, the fourth plurality of drive fingers being interdigitated with the third plurality of drive fingers.

15. The sensor of claim 14, wherein the drive system further includes:
a first feedback electrode connected to the substrate and having a first plurality of feedback fingers projecting along the drive axis toward the first mass;

a second plurality of feedback fingers projecting along the drive axis toward the first feedback electrode from the first mass, the second plurality of feedback fingers being interdigitated with the first plurality of feedback fingers;

a second feedback electrode connected to the substrate and having a third plurality of feedback fingers projecting along the drive axis toward the second mass; and a fourth plurality of feedback fingers projecting along the drive axis toward the second feedback electrode from the second mass, the fourth plurality of feedback fingers being interdigitated with the third plurality of feedback fingers.

16. The sensor of claim 14, wherein the first mass and the second mass each includes a upper crossbar and a lower crossbar, the drive system further includes:

a third drive electrode connected to the substrate and located between the upper crossbar and the lower crossbar of the second mass, the third drive electrode having a fifth plurality of drive fingers projecting along the drive axis from the third drive electrode toward the upper crossbar of the second mass;

a sixth plurality of drive fingers projecting along the drive axis toward the third drive electrode from the upper crossbar of the second mass, the sixth plurality of drive fingers interdigitated with the fifth plurality of drive fingers;

a fourth drive electrode connected to the substrate and located between the upper crossbar and the lower crossbar of the first mass, the fourth drive electrode having a seventh plurality of drive fingers projecting along the drive axis toward the lower crossbar of the first mass from the fourth drive electrode; and an eighth plurality of drive fingers projecting along the drive axis toward the fourth drive electrode from the lower crossbar of the first mass, the eighth plurality of drive fingers being interdigitated with the seventh plurality of drive fingers.

17. A microfabricated gyroscopic sensor to measure rotation about an input axis, comprising:

a substrate having a surface;

a first mass connected to the substrate by a suspension system;

a second mass connected to the substrate by the suspension system;

a drive system to apply an oscillatory force to the first mass and the second mass along a drive axis generally parallel to the surface of the substrate to cause the first mass and the second mass to vibrate in an antiparallel mode; and a position sensor to measure a deflection of the first mass and the second mass along a sense axis perpendicular to the drive axis and generally parallel to the surface of the substrate, wherein rotation of the first mass and the second mass about the input axis perpendicular to the surface of the substrate and vibration of the first mass and the second mass along the drive axis generates a Coriolis force to vibrate the first mass and the second mass along the sense axis in antiphase to each other.

18. The sensor of claim 17, further comprising a coupling system connecting the first mass and the second mass.

19. A microfabricated gyroscopic sensor to measure rotation about an input axis, comprising:

a substrate having a surface;

a first mass;

a second mass;

a coupling system connecting the first mass and the second mass;

a suspension system connecting the first mass and the second mass to the substrate;

a first drive electrode connected to the substrate;

a second drive electrode connected to the substrate and positioned substantially in parallel to the first drive electrode;

a first voltage source coupled to the first drive electrode and the second drive electrode to apply an alternating voltage to the first drive electrode and the second drive electrode;

a second voltage source coupled to the first mass and the second mass to apply a DC voltage to the first mass and the second mass, the first mass and the second mass vibrating in opposing directions along a drive axis substantially parallel to the surface of the substrate in response to alternating voltages being applied to the first and second drive electrodes by the first voltage source; and a position sensor to measure a displacement of the first mass and the second mass along a sense axis perpendicular to the drive axis and generally parallel to the surface of the substrate, wherein rotation of the first mass and the second mass about the input axis and vibration of the first mass and the second mass along the drive axis generates a Coriolis force to vibrate the first mass and the second mass along the sense axis in antiphase to each other.

20. A method of sensing rotation with a microfabricated gyroscopic sensor, comprising:

vibrating a microfabricated first mass connected to a substrate along a drive axis generally parallel to a surface of the substrate;

vibrating a microfabricated second mass connected to the substrate and to the first mass along the drive axis generally parallel to the surface of the substrate;

rotating a first mass and the second mass about an input axis generally perpendicular to a surface of the substrate, rotation of the first mass and the second mass about the input axis and vibration of the first mass and the second mass along the drive axis generating a Coriolis force to vibrate the first mass and the second mass along a sense axis perpendicular to the drive axis and parallel to the surface of the substrate; and measuring a displacement of the first mass and the second mass along the sense axis.

21. The method of claim 20, further including:

causing the first mass and the second mass to vibrate in antiphase along the drive axis.

22. The method of claim 20, wherein the input axis is perpendicular to the drive axis and the sense axis.

23. The method of claim 20, further including:

measuring a difference in displacements of the first and second masses along the sense axis.

* * * * *

UNITED STATES PATENT AND TRADEMARK OFFICE
CERTIFICATE OF CORRECTION

PATENT NO.    : 6,250,156 B1
DATED         : June 26, 2001
INVENTOR(S)   : Ashwin A. Seshia and Roger T. Howe It is certified that error appears in the above-identified patent and that said Letters Patent is hereby corrected as shown below:

<u>Title page,</u>
Item [63], Related U.S. Application Data, should read:

-- Continuation-in-part of application No. 08/865,726, filed on May 30, 1997, now Pat. No. 6,067,858, which is a continuation-in-part of application No. 08/658,924, filed on May 31, 1996, now Pat. No. 5,992,233. --

Signed and Sealed this

Twentieth Day of May, 2003

JAMES E. ROGAN
*Director of the United States Patent and Trademark Office*